United States Patent
Konishi

(10) Patent No.: US 10,242,516 B2
(45) Date of Patent: Mar. 26, 2019

(54) CAR SHARING SYSTEM AND IN-VEHICLE APPARATUS FOR CAR SHARING SYSTEM

(71) Applicant: DENSO CORPORATION, Kariya, Aichi-pref. (JP)

(72) Inventor: Kenji Konishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 21 days.

(21) Appl. No.: 15/514,038

(22) PCT Filed: Sep. 14, 2015

(86) PCT No.: PCT/JP2015/004651
§ 371 (c)(1),
(2) Date: Mar. 24, 2017

(87) PCT Pub. No.: WO2016/051692
PCT Pub. Date: Apr. 7, 2016

(65) Prior Publication Data
US 2017/0278329 A1    Sep. 28, 2017

(30) Foreign Application Priority Data

Oct. 1, 2014   (JP) ................................. 2014-203062
Dec. 12, 2014  (JP) ................................. 2014-252352

(51) Int. Cl.
*G07C 9/00* (2006.01)
*B60R 25/04* (2013.01)
(Continued)

(52) U.S. Cl.
CPC .......... *G07C 9/00111* (2013.01); *B60R 25/04* (2013.01); *B60R 25/24* (2013.01);
(Continued)

(58) Field of Classification Search
None
See application file for complete search history.

(56) References Cited

U.S. PATENT DOCUMENTS 3,665,397 A * 5/1972 Di Napoli ............ G06Q 10/087
                                          340/5.42
4,360,875 A * 11/1982 Behnke ................. G01C 21/00
                                          379/93.02
(Continued)

FOREIGN PATENT DOCUMENTS

JP    2004227513 A    8/2004
JP    2010237842 A    10/2010
(Continued)

*Primary Examiner* — Mussa A Shaawat
(74) *Attorney, Agent, or Firm* — Harness, Dickey & Pierce, P.L.C.

(57) ABSTRACT

A car sharing system includes: an IC card carried by a user and including an identification ID of the user; an in-vehicle apparatus that is mounted on a vehicle, and includes a card reading portion reading the IC card and a switch control portion performing an on-off control of a vehicle power source switch that allows traveling of a vehicle; and a management apparatus that is disposed in a reservation management center, wirelessly communicates with the in-vehicle apparatus, manages an operation status of the vehicle, and further manages reservation information. The in-vehicle apparatus reads the IC card by the card reading portion and, based on authentication of an the identification ID by collation between the identification ID, which is read, and the reservation information, executes a check-in process of the vehicle and turns on the vehicle power source switch.

22 Claims, 22 Drawing Sheets

(51) Int. Cl.
*G06K 7/10* (2006.01)
*B60R 25/24* (2013.01)
*G06Q 10/02* (2012.01)
*G06Q 50/10* (2012.01)
*G08G 1/00* (2006.01)

(52) U.S. Cl.
CPC ......... *G06K 7/10366* (2013.01); *G06Q 10/02* (2013.01); *G06Q 50/10* (2013.01); *G08G 1/20* (2013.01)

(56) References Cited

U.S. PATENT DOCUMENTS

| | | | | |
|---|---|---|---|---|
| 5,206,643 A | * | 4/1993 | Eckelt | E04H 6/42 194/902 |
| 5,289,369 A | * | 2/1994 | Hirshberg | G06Q 10/02 235/382.5 |
| 5,812,070 A | * | 9/1998 | Tagami | G07F 17/0042 340/457.4 |

FOREIGN PATENT DOCUMENTS

| | | | | |
|---|---|---|---|---|
| JP | 2011128987 A | | 6/2011 | |
| JP | 2012221224 A | * | 11/2012 | ............ G06F 17/60 |
| JP | 2014109892 A | | 6/2014 | |
| WO | WO-2013137182 A1 | | 9/2013 | |

\* cited by examiner

FIG. 22A

| ☐ | USER | E-MAIL | IN USE | NUMBER OF TIMES OF USAGE | FINAL USE DATE | APPLICATION STATUS | ADDRESS | ROLE | LICENSE NO. |
|---|---|---|---|---|---|---|---|---|---|
| | JIRO YAMADA | | | | | | | | |
| | | | | | | | | | |
| | | | | | | | | | |
| | | | | | | | | | |

MEMBER SEARCH
NAME / CONTACT / ADDRESS
ROLE / APPLICATION STATUS / LICENSE NO.
USAGE YES/NO / PAST NO USE / NUMBER OF TIMES OF USAGE ~

FIG. 22B

■USE HISTORY
USER: JIRO YAMADA

| DEPARTURE SCHEDULE | DEPARTURE STATION | STATUS |
|---|---|---|
| 2014-12-13 10:00 | STATION FRONT | NOT CHECKED IN |
| 2014-12-12 17:00 | LIBRARY | COMPLETION |
| 2014-12-10 09:00 | LIBRARY | COMPLETION |
| 2014-12-08 17:00 | CITY HALL | COMPLETION |
| 2014-12-07 15:00 | LIBRARY | COMPLETION |
| 2014-12-06 17:00 | STATION FRONT | COMPLETION |
| 2014-12-05 11:00 | LIBRARY | COMPLETION |
| 2014-12-02 13:00 | LIBRARY | COMPLETION |

FIG. 22C

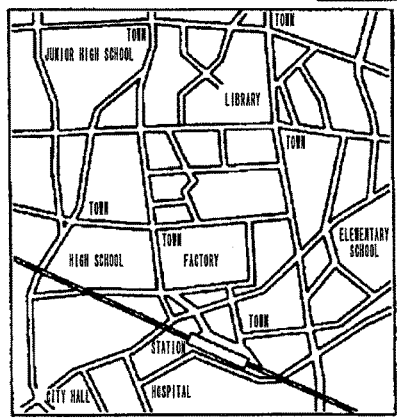

RESERVATION   RESERVATION STATUS
DEPARTURE STATION
STATION FRONT
ARRIVAL STATION
CITY HALL
RESERVATION USER
JIRO YAMADA
DEPARTURE TIME
2014-12-13 10:00
ARRIVAL TIME
2014-12-13 11:00
VEHICLE MODEL CLASS
Micro-mobility
VEHICLE MODEL

MODEL NO.
123456

37 FORCED CHECK-IN

CAR SHARING SYSTEM AND IN-VEHICLE APPARATUS FOR CAR SHARING SYSTEM

CROSS-REFERENCE TO RELATED APPLICATIONS

This application is a U.S. National Phase Application under 35 U.S.C. 371 of International Application No. PCT/JP2015/004651 filed on Sep. 14, 2015 and published in Japanese as WO 2016/051692 A1 on Apr. 7, 2016. This application is based on and claims the benefit of priority from Japanese Patent Application No. 2014-203062 filed on Oct. 1, 2014 and Japanese Patent Application No. 2014-252352 filed on Dec. 12, 2014. The entire disclosures of all of the above applications are incorporated herein by reference.

TECHNICAL FIELD

The present disclosure relates to a car sharing system that allows shared use of a vehicle by multiple members, and an in-vehicle apparatus for the car sharing system.

BACKGROUND ART

A system described in Patent Literature 1 is known as an example of a car sharing system. According to this system, a door of a vehicle is opened by a cellular phone or an IC card type driver's license to which a member identification ID has been given. A key box provided inside the vehicle is unlocked to take out a start key (key component) from the key box. The start key thus taken out is operated to use the vehicle.

The present inventor has found the followings.

According to the car sharing system having the conventional configuration, it is necessary to install a key box within the vehicle, and control locking and unlocking of the key box. In this case, the manufacturing cost increases by the necessity to install the key box.

PRIOR ART LITERATURE

Patent Literature

Patent Literature 1: JP 2010-237842 A

SUMMARY OF INVENTION

An object of the present disclosure is to provide a car sharing system and an in-vehicle apparatus for a car sharing system capable of reducing manufacturing cost.

A car sharing system according to one example of the present disclosure includes: an IC card that is carried by a user and includes an identification ID of the user; an in-vehicle apparatus that is mounted on a vehicle, and includes a card reading portion reading the IC card and a switch control portion performing an on-off control of a vehicle power source switch that allows traveling of a vehicle; and a management apparatus that is disposed in a reservation management center, wirelessly communicates with the in-vehicle apparatus, manages an operation status of the vehicle, and further manages reservation information. The in-vehicle apparatus reads the IC card by the card reading portion and, based on authentication of an the identification ID by collation between the identification ID, which is read, and the reservation information, executes a check-in process of the vehicle and turns on the vehicle power source switch.

An in-vehicle apparatus for a car sharing system according to one example of the present disclosure includes: a card reading portion that reads an IC card including an identification ID of a user; a switch control portion that performs an on-off control of a vehicle power source switch that allows traveling of a vehicle; and a communication portion that wirelessly communicates with a management apparatus in a reservation management center. The switch control portion performs a process allowing traveling of the vehicle and transmits an on-control signal that turns on the vehicle power source switch to the vehicle based on collation between an identification ID read from the IC card by the card reading portion and authentication information managed by the management apparatus.

A car sharing system according to one example of the present disclosure includes: an in-vehicle apparatus that is mounted on a vehicle, and includes a card reading portion reading an IC card and a switch control portion performing an on-off control of a vehicle power source switch that allows traveling of a vehicle; a management apparatus that is disposed in a reservation management center, wirelessly communicates with the in-vehicle apparatus, manages an operation status of the vehicle, and further manages reservation information; and an external terminal that communicates with the management apparatus. The external terminal transmits instruction information to the management apparatus to instruct check-in to the vehicle. The management apparatus transmits forced check-in instruction information to the in-vehicle apparatus upon reception of the instruction information from the external terminal to instruct check-in to the vehicle, causing the vehicle power source switch to be turned on with execution of a check-in process of the vehicle.

A car sharing system according to one example of the present disclosure includes: an in-vehicle apparatus that is mounted on a vehicle, and includes a card reading portion reading an IC card and a switch control portion performing an on-off control of a vehicle power source switch that allows traveling of a vehicle; a management apparatus that is disposed in a reservation management center, wirelessly communicates with the in-vehicle apparatus, manages an operation status of the vehicle (4), and further manages reservation information; and an external terminal that communicates with the management apparatus. The external terminal transmits instruction information to the management apparatus to instruct check-out from the vehicle. The management apparatus transmits forced check-out instruction information to the in-vehicle apparatus upon reception of the instruction information from the external terminal to instruct check-out from the vehicle, causing the vehicle power source switch to be turned off with execution of a check-out process of the vehicle.

An in-vehicle apparatus for a car sharing system according to one example of the present disclosure includes: a switch control portion that performs an on-off control of a vehicle power source switch that allows traveling of a vehicle; and a communication portion that wirelessly communicates with a management apparatus in a reservation management center. The switch control portion performs a check-in process of the vehicle and turns on the vehicle power source switch upon reception of second instruction information transmitted from the management apparatus to the communication portion to instruct check-in to the vehicle in response to first instruction information transmitted from the external terminal to the management apparatus to instruct check-in to the vehicle.

An in-vehicle apparatus for a car sharing system according to one example of the present disclosure includes: a switch control portion that performs an on-off control of a vehicle power source switch that allows traveling of a vehicle; and a communication portion that wirelessly communicates with a management apparatus in a reservation management center. The switch control portion performs a check-out process of the vehicle and turns off the vehicle power source switch upon reception of second check-out information transmitted from the management apparatus to the communication portion to instruct check-out from the vehicle in response to first check-out information transmitted from the external terminal to the management apparatus to instruct check-out from the vehicle.

According to the car sharing system and the in-vehicle apparatus for the car sharing system, the necessity to install a key box and a start key is eliminated. Accordingly, manufacturing cost decreases.

BRIEF DESCRIPTION OF DRAWINGS

The above and other aspects, features and advantages of the present disclosure will become more apparent from the following detailed description made with reference to the accompanying drawings. In the drawings:

FIG. 22A is a view illustrating an operation screen of a management apparatus;

FIG. 22B is a view illustrating an operation screen of the management apparatus; and FIG. 22C is a view illustrating an operation screen of the management apparatus.

DESCRIPTION OF EMBODIMENTS

Figure 1:
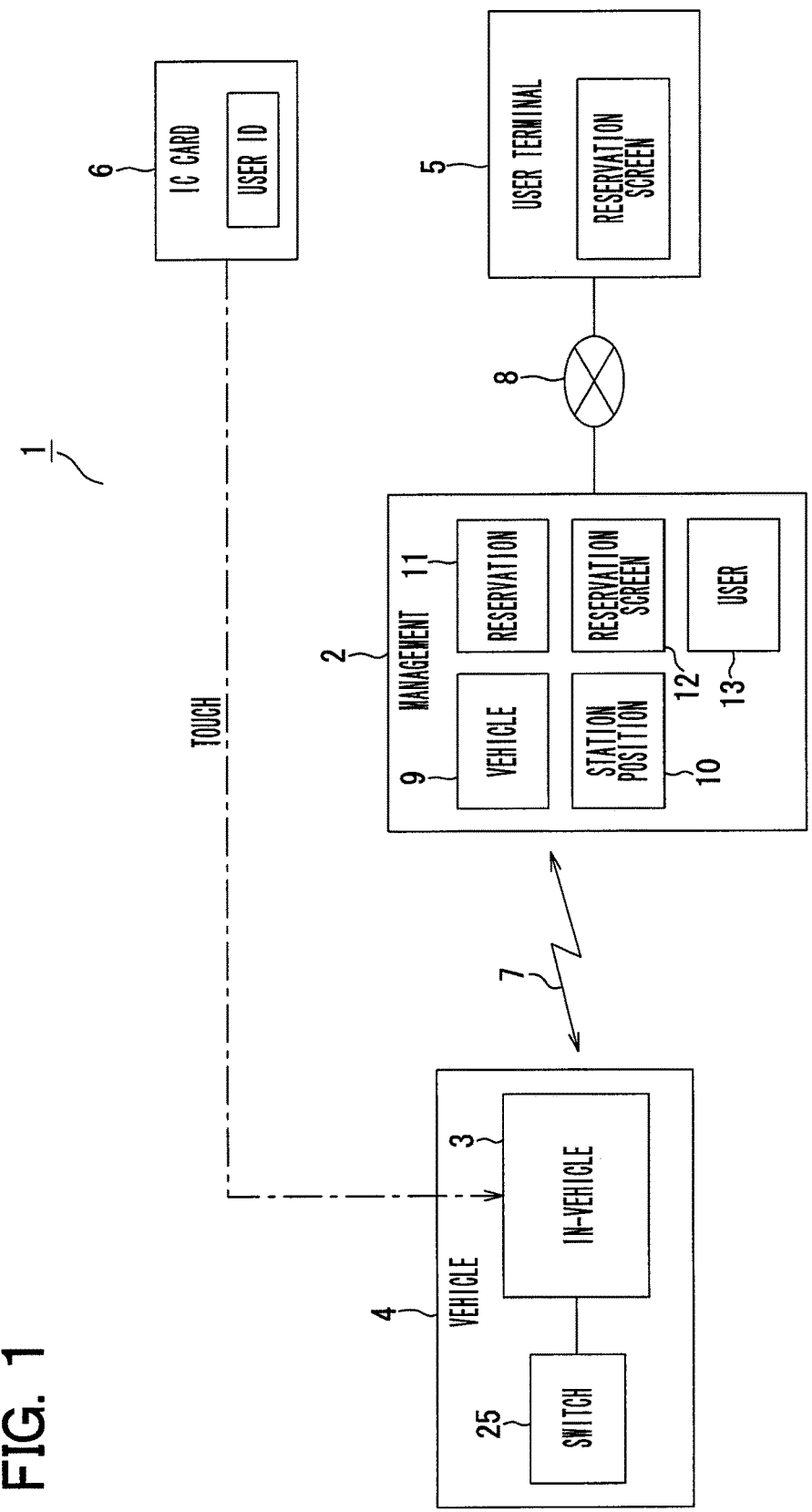
FIG. 1 is a block diagram illustrating a general schematic configuration of a car sharing system according to a first embodiment of the present disclosure.

A first embodiment of the present disclosure is hereinafter described with reference to FIGS. 1 to 17. Firstly, FIG. 1 is a block diagram illustrating a general schematic configuration of a car sharing system 1 according to the present embodiment. As illustrated in FIG. 1, the car sharing system 1 includes a management apparatus 2 disposed at a reservation management center, one or more vehicles 4 on each of which an in-vehicle apparatus 3 of a car sharing system is mounted, user terminals 5 each of which is operated by corresponding one of members (users), and IC cards 6 each of which is carried by corresponding one of the members.

The management apparatus 2 has a function of wirelessly communicating with the in-vehicle apparatus 3 of each of the vehicles 4 via a wireless communication network 7 such as a cellular phone communication network, and also has a function of communicating with each of the user terminals 5 via a communication network 8 such as a cellular phone communication network and the Internet. The management apparatus 2 includes a vehicle management portion 9, a station position information management portion 10, a reservation management portion 11, a reservation screen generation portion 12, and a user information management portion 13.

The vehicle management portion 9 has a function of managing an operation status of each of the one or more vehicles 4 used in the car sharing system 1 to obtain and record (accumulate) information about the operation status of each of the vehicles 4 (such as information indicating a car sharing state or a standby state, position information about the vehicle 4, and date information) by communicating with the in-vehicle apparatus 3 of each of the vehicles 4. The station position information management portion 10 records information about positions of multiple stations for parking of the standby vehicles 4 (and information about geo-fences of stations).

The reservation management portion 11 has a function of communicating with the user terminals 5 operated by the respective users for reservations, and receiving and managing the reservations from the users. The reservation management portion 11 records the reservation from the users. The reservation screen generation portion 12 has a function of generating a reservation screen for receiving reservations from the users. The reservation screen thus generated is displayed on a display device of the user terminals 5 operated by the users for reservations. The user information management portion 13 has a function of managing information about the respective users, and records (accumulates) information such as identifications IDs, names, addresses, ages, and car sharing usage statuses of the respective users. Note that each of the user terminals 5 is configured by a smartphone, a personal computer or the like.

Figure 2:
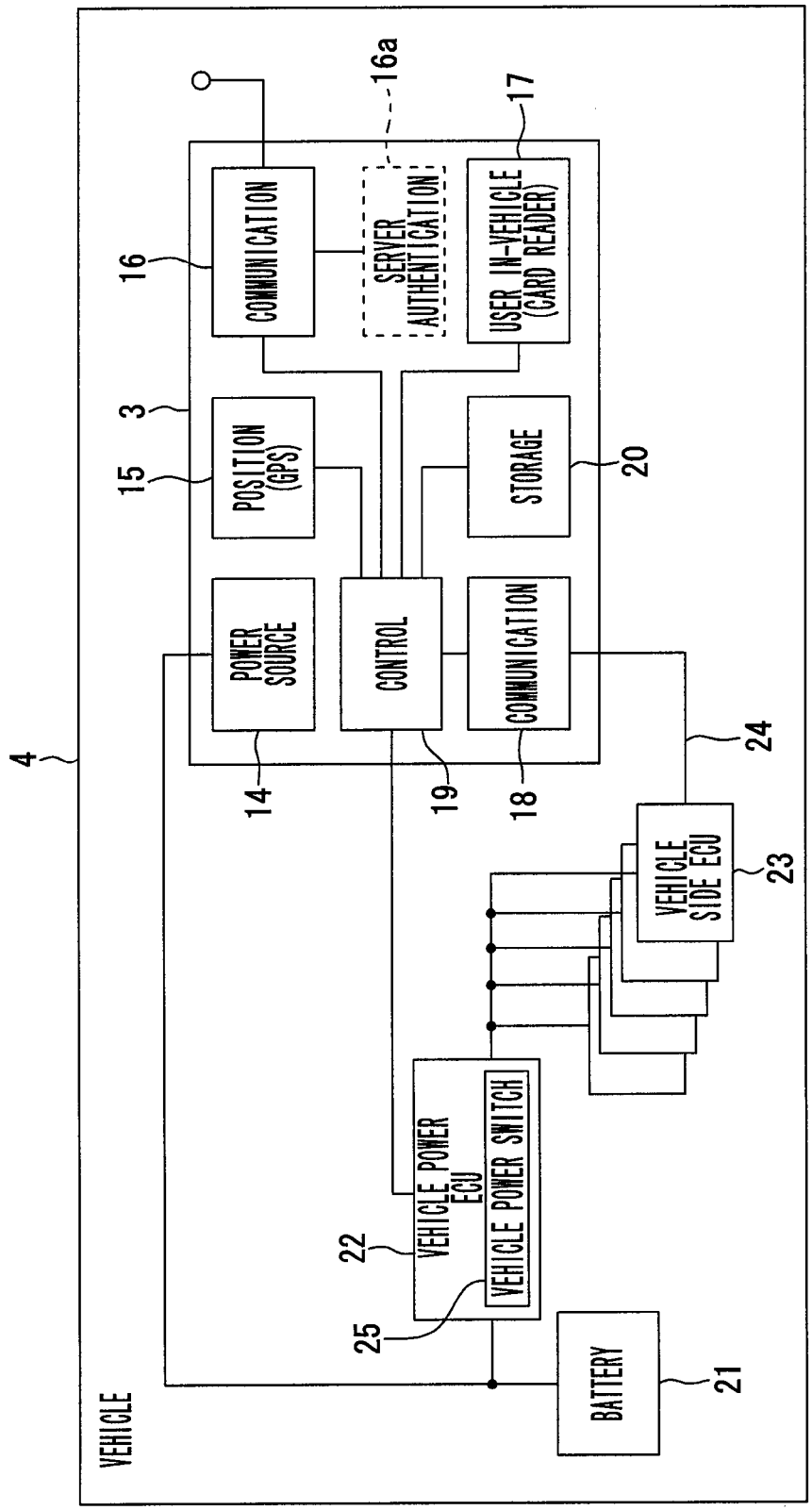
FIG. 2 is a block diagram illustrating an in-vehicle apparatus and a vehicle.

As illustrated in FIG. 2, the in-vehicle apparatus 3 includes an in-vehicle apparatus power source portion 14, a position information obtaining portion (position detection portion) 15, a communication portion 16, a user checking portion (card reading portion) 17, a vehicle communication portion 18, a control portion (switch control portion) 19, and a storage portion 20. The in-vehicle apparatus power source portion 14 generates a power source for the in-vehicle apparatus 3 from a power source received from a battery 21 of the vehicle 4, and supplies the generated power source to each of portions of the in-vehicle apparatus 3. The position information obtaining portion 15 is configured by a global positioning system (GPS) receiving device, for example, and is configured to detect a current position of the vehicle 4, and output the detected current position information to the control portion 19.

The communication portion 16 has a function of wirelessly communicating with the management apparatus 2 at the reservation management center via a wireless communication network 7. The communication portion 16 transmits information received from the control portion 19 to the management apparatus 2. The communication portion 16 also receives information from the management apparatus 2, and outputs the received information to the control portion 19. The communication portion 16 has a function (server authentication portion 16a) of authenticating whether the management apparatus 2 is a proper management apparatus (server) of the car sharing system 1 for communication with the management apparatus 2.

The user checking portion 17 is configured by a card reader or the like capable of reading information from the IC card 6. The user checking portion 17 outputs information read from the IC card 6 to the control portion 19. According to the present embodiment, the IC card 6 is configured by a non-contact IC card, for example. In this case, the user checking portion 17 has a function of reading a non-contact IC card. However, the IC card 6 may be configured by a contact IC card, and the user checking portion 17 may have a function of reading a contact IC card.

The vehicle communication portion 18 has a function of communicating with multiple vehicle side ECUs 23 mounted on the vehicle 4. This communication is performed via an in-vehicle LAN 24. The control portion 19 has a function of controlling the overall operation of the in-vehicle apparatus 3, and a function of turning on or off a vehicle power source switch 25 incorporated in a vehicle power source ECU 22 of the vehicle 4 by outputting a power source switch-on signal (on-control signal) or a power source switch-off signal (off-control signal) to the vehicle power source ECU 22. The storage portion 20 is configured by an EEPROM, a flash memory, a RAM or the like, for example, and stores control programs and various types of data. The storage portion 20 is configured to store information such as reservation information transmitted from the management apparatus 2 to the in-vehicle apparatus 3.

The vehicle power source ECU 22 of the vehicle 4 receives the power source switch-on signal or the power source switch-off signal from the in-vehicle apparatus 3 (control portion 19), and turns on or off the vehicle power source switch 25. The vehicle power source switch 25 is a switch corresponding to an ignition switch (IG) of the vehicle 4, and is configured by a mechanical switch or a semiconductor switch. When the vehicle power source switch 25 is turned on, the user is allowed to start traveling (start engine, motor or the like) of the vehicle 4. When the vehicle power source switch 25 is turned off, traveling of the vehicle 4 is not allowed.

The vehicle power source ECU 21 not receiving the power source switch-on signal from the in-vehicle apparatus 3 does not allow traveling of the vehicle 4 (suspends power source supply to various vehicle side ECUs 23 and the like mounted on vehicle 4, for example) by the user even when the vehicle power source switch 25 is turned on by some means. This configuration prevents robbery or the like of the vehicle 4.

At least one of the vehicle side ECUs 23 mounted on the vehicle 4 is configured to communicate with the vehicle communication portion 18 of the in-vehicle apparatus 3 via the in-vehicle LAN 24. According to this configuration, the corresponding vehicle side ECU 23 is allowed to receive, from the vehicle communication portion 18, information indicating output of the power source switch-on signal from the in-vehicle apparatus 3 to the vehicle power source ECU 21. When a control signal for turning on the vehicle power source switch 25 (power source switch-on signal) is not output from the control portion 19 of the in-vehicle apparatus 3 in the on-state of the vehicle power source switch 25, the vehicle side ECU 23 does not allow traveling of the vehicle 4 (suspends power source supply to various vehicle side ECUs 23 or the like mounted on vehicle 4, or issues command for stopping engine, motor or the like to ECU controlling engine, motor or the like, for example). With this configuration, it is possible to prevent robbery or the like of the vehicle 4.

Figure 3:
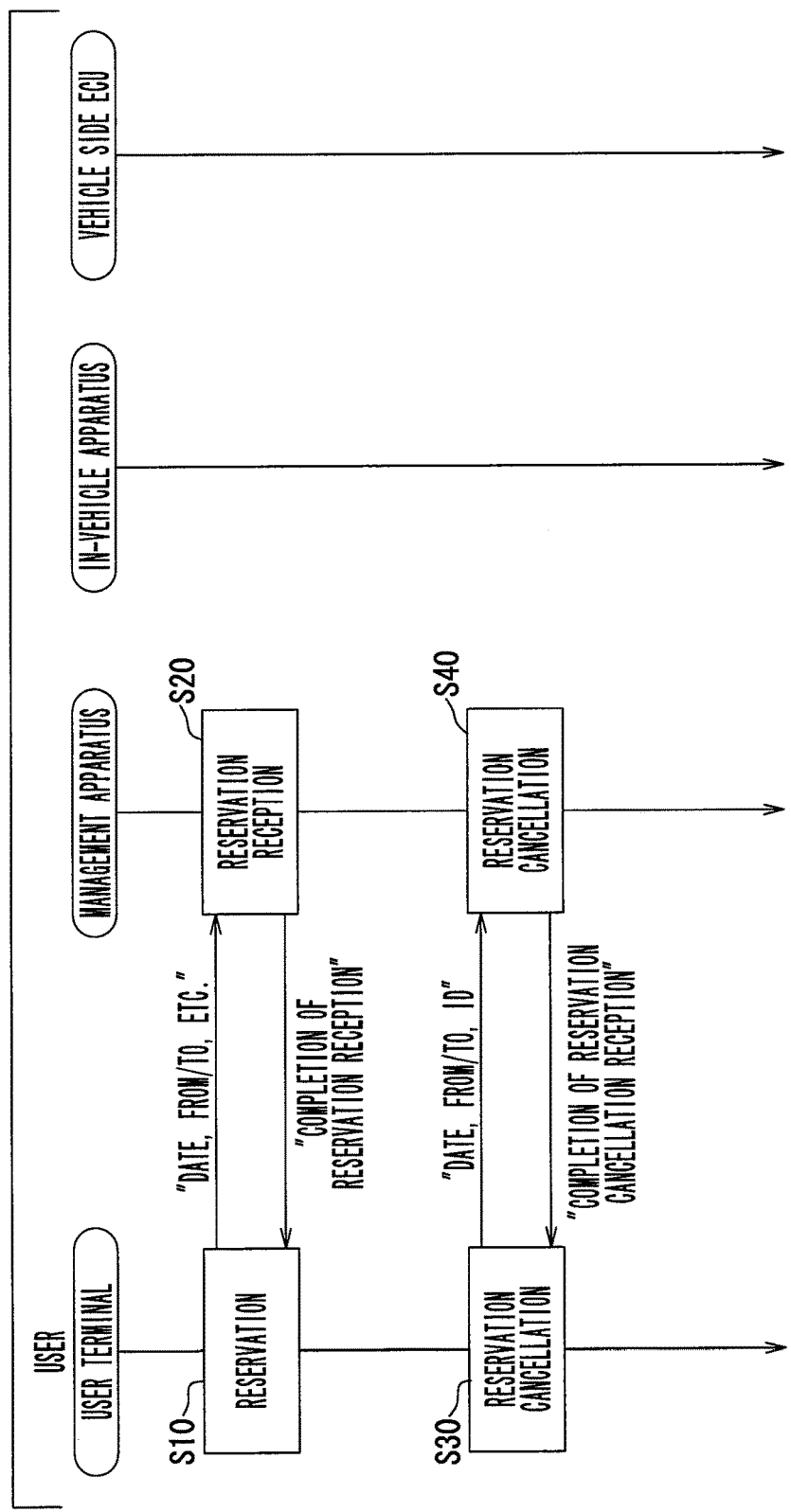
FIG. 3 is a diagram illustrating an operation for reservation of the vehicle for car sharing.

An operation of the car sharing system 1 configured as above is hereinafter described with reference to sequence diagrams of FIGS. 3 to 12. Firstly, FIG. 3 illustrates an operation for reservation of the vehicle 4 for car sharing. This operation is performed between the user terminal 5 of the user and the management apparatus 2 at the reservation management center. When the user performs a reservation operation by using the user terminal 5 (S10) as illustrated in FIG. 3, information such as date, "from" (departure) and "to" (return) stations, and identification ID of the user is transmitted to the management apparatus 2 as reservation information. The management apparatus 2 thus receives the reservation (S20). When the reception of the reservation is completed by the management apparatus 2, information about completion of the reception of the reservation is transmitted to the user terminal 5. When this information about completion of the reception of the reservation is received by the user terminal 5, a message showing completion of the reception of the reservation is displayed on a display device of the user terminal 5 as pop-up display, for example.

When the user subsequently performs a reservation canceling operation by using the user terminal 5 in S30, the reservation information (such as date, "from" and "to" stations, identification ID of user), and reservation cancellation information are transmitted to the management apparatus 2 to cancel the reservation by the management apparatus 2 (S40). When cancellation of the reservation is completed by the management apparatus 2, information indicating reception completion of reservation cancellation is transmitted to the user terminal 5. When the information indicating the reception completion of the reservation cancellation is received by the user terminal 5, a message showing the reception completion of the reservation cancellation is displayed on the display device of the user terminal 5 by pop-up display, for example.

Figure 4:
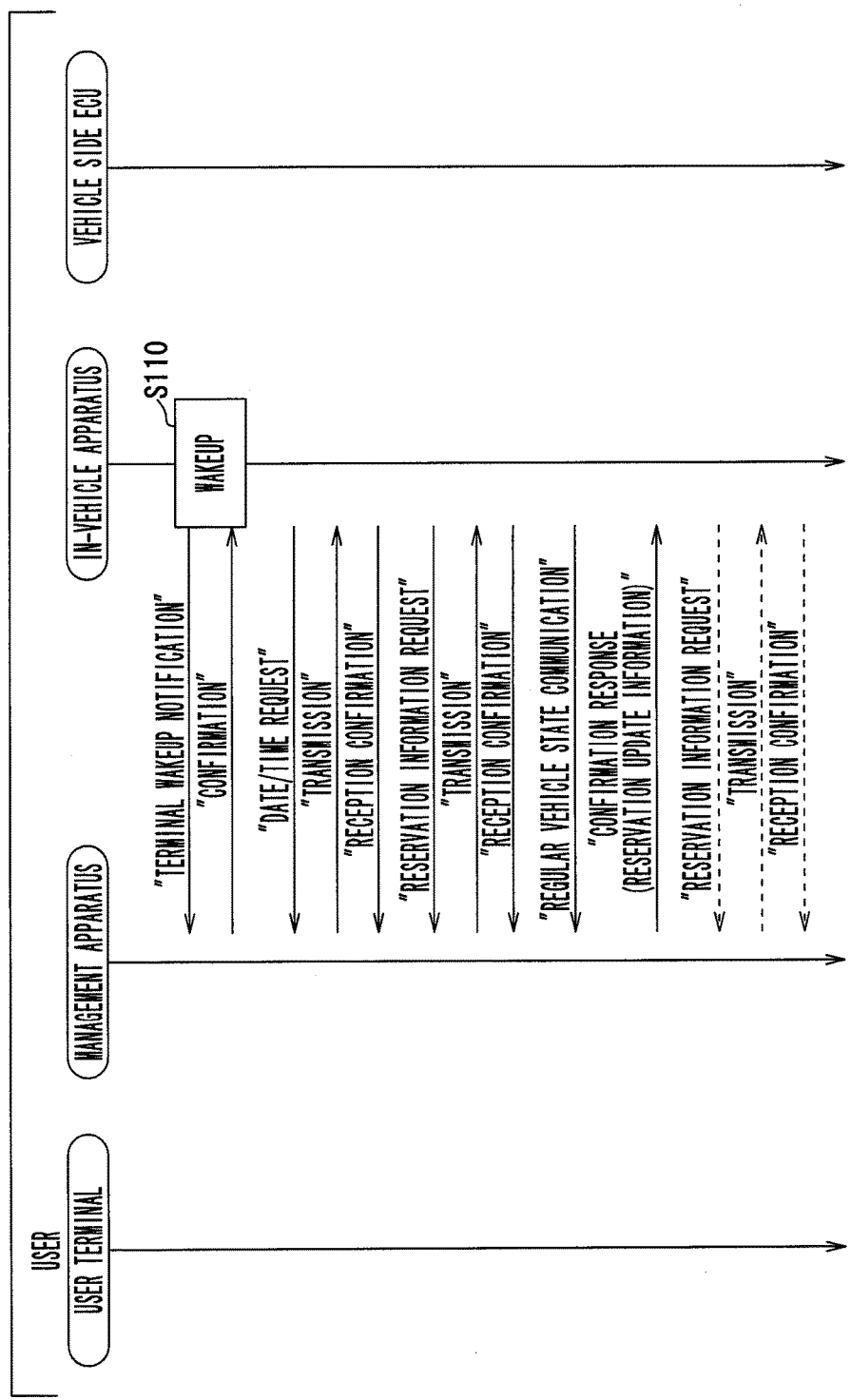
FIG. 4 is a diagram illustrating an operation at the time of rising of the in-vehicle apparatus.

FIG. 4 shows an operation of the in-vehicle apparatus 3 at the time of rising. Note that the car sharing system 1 of the present embodiment is a system that operates only in a time zone of a daytime set beforehand, and pauses during nighttime. As illustrated in FIG. 4, the in-vehicle apparatus 3 is automatically powered from a sleep mode at a preset rising time (such as one hour before operation start time of car sharing system 1) (S110). Thereafter, the in-vehicle apparatus 3 transmits a signal of terminal rising notification to the management apparatus 2. When receiving the signal of terminal rising notification from the in-vehicle apparatus 3, the management apparatus 2 transmits a signal of terminal rising notification confirmation to the in-vehicle apparatus 3.

Subsequently, the in-vehicle apparatus 3 transmits a signal of a date and time request to the management apparatus 2. When receiving the signal of the date and time request from the in-vehicle apparatus 3, the management apparatus 2 transmits information about the date and time to the in-vehicle apparatus 3. When receiving the information about the date and time from the management apparatus 2, the in-vehicle apparatus 3 transmits a signal of date and time reception confirmation to the management apparatus 2.

The in-vehicle apparatus 3 also transmits a signal of a reservation information request to the management apparatus 2. When receiving the signal of the reservation information request from the in-vehicle apparatus 3, the management apparatus 2 transmits reservation information to the in-vehicle apparatus 3. When receiving the reservation information from the management apparatus 2, the in-vehicle apparatus 3 stores the received reservation information in the storage portion 20, and transmits reservation information reception confirmation to the management apparatus 2.

The in-vehicle apparatus 3 further transmits information about a vehicle state immediately after rising (vehicle information) to the management apparatus 2. When receiving the information about the vehicle state from the in-vehicle apparatus 3, the management apparatus 2 transmits a signal of a reception confirmation response to the in-vehicle apparatus 3. Thereafter, information about the vehicle state (vehicle information) is transmitted to the management apparatus 2 regularly (at intervals of set time) until check-in by the user. When receiving information about the vehicle state from the in-vehicle apparatus 3, the management apparatus 2 transmits a signal of a reception confirmation response to the in-vehicle apparatus 3. When new reservation information is present, the management apparatus 2 transmits a reception confirmation response signal which contains information indicating the necessity to update reservation information to the in-vehicle apparatus 3.

When receiving the information indicating the necessity to update reservation information, the in-vehicle apparatus 3 transmits a signal of a reservation information request to the management apparatus 2. When receiving the signal of the reservation information request from the in-vehicle apparatus 3, the management apparatus 2 transmits reservation information to the in-vehicle apparatus 3. When receiving the reservation information from the management apparatus 2, the in-vehicle apparatus 3 stores the received reservation information in the storage portion 20, and transmits a signal of reservation information reception confirmation to the management apparatus 2. Thereafter, information about the vehicle state (vehicle information) is regularly transmitted to the management apparatus 2 until check-in by the user. When new reservation information is present, a reservation information update process (process for transmitting reservation information to in-vehicle apparatus 3 and storing the information) is performed.

Figure 5:
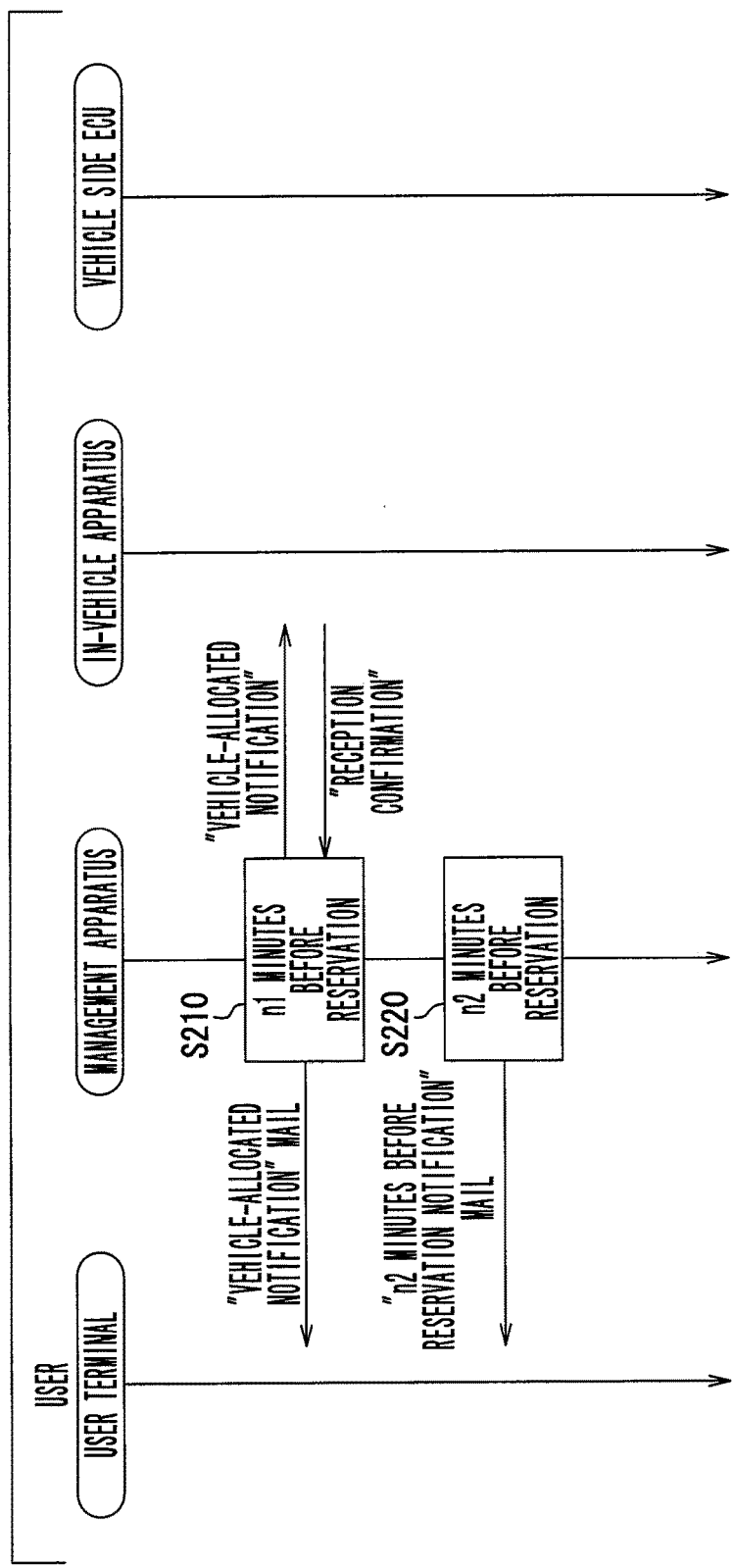
FIG. 5 is a diagram illustrating an operation performed immediately before reservation.

FIG. 5 illustrates an operation n1 minute(s) before a reservation time, and an operation n2 minute(s) before the reservation time. Note that the length of n1 is longer than the length of n2. As illustrated in FIG. 5, when it is n1 minute(s) before the reservation time (S210), the management apparatus 2 transmits a vehicle-allocated notification mail to the user terminal 5 of the user, and also transmits vehicle-allocated notification to the in-vehicle apparatus 3 of the corresponding vehicle 4. Thereafter, when it is n2 minute(s) before the reservation time (S220), the management apparatus 2 transmits a notification mail indicating that it is n2 minute(s) before the reservation time to the user terminal 5.

Figure 6:
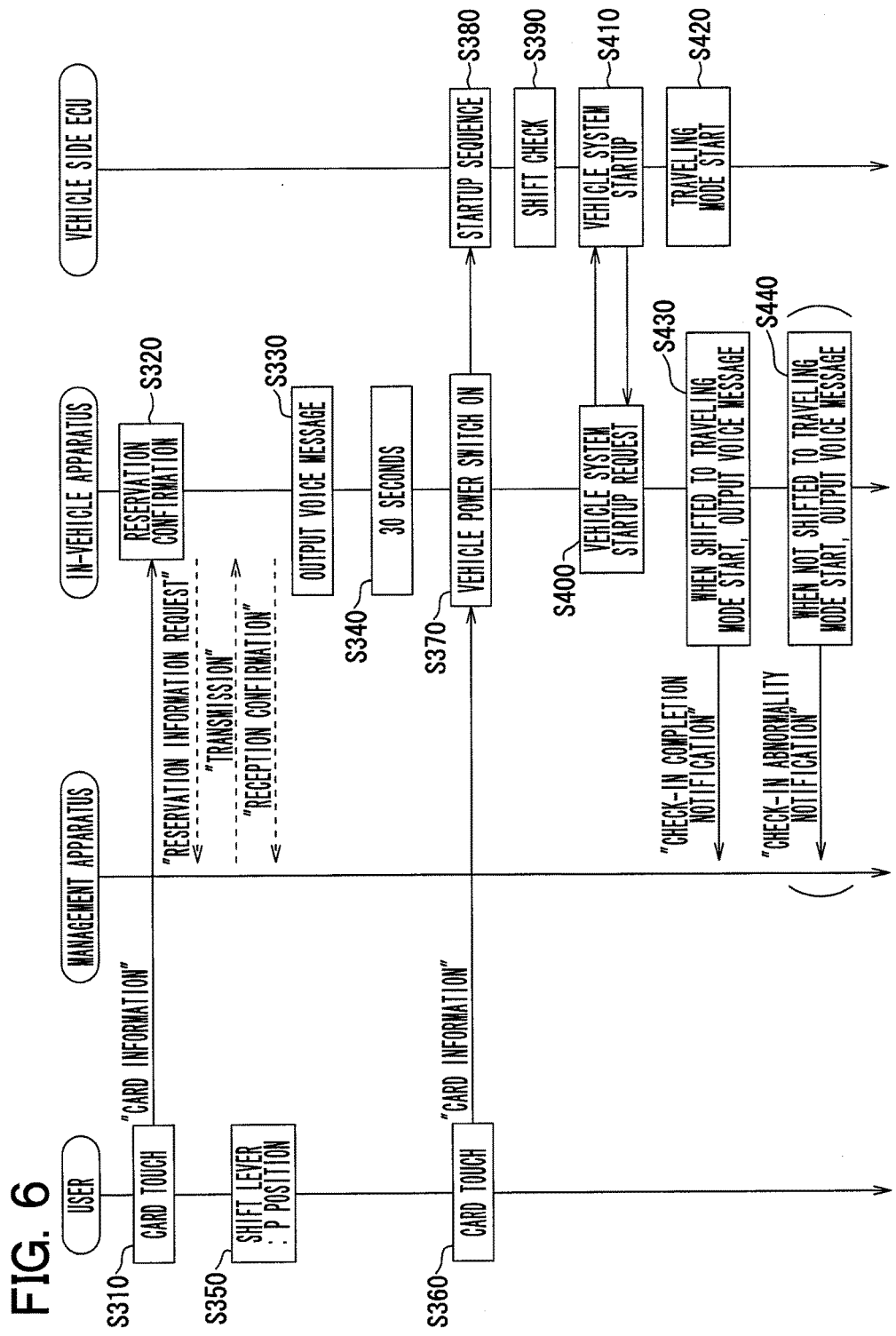
FIG. 6 is a diagram illustrating an operation for check-in to the vehicle by a user.

FIG. 6 illustrates an operation performed by the user for check-in to the vehicle 4 (that is, a series of processes performed for vehicle 4 and car sharing system 1 to start use of the vehicle 4). According to this operation, as shown in S310 in FIG. 6, the user checking portion 17 (card reader) included in the in-vehicle apparatus 3 within the vehicle 4 is touched by the user with the IC card 6. In this case, the in-vehicle apparatus 3 reads the IC card 6 of the user, and collates the read identification ID with reservation information to check reservation (S320). When no associated reservation information is present, the in-vehicle apparatus 3 inquires the management apparatus 2 about reservation information. Note that the reservation information corresponds to information for authentication managed by the management apparatus 2.

When it is determined that the reservation information has been confirmed in S320, a voice message "Checking in. Please check that shift lever is at P position." is output, for example (S330). Thereafter, a standby state continues for a set time such as 30 seconds until the user touches the user checking portion 17 (card reader) of the in-vehicle apparatus 3 with the IC card 6 (S340). The user having heard the voice message checks whether the shift lever has been shifted to the P position (S350).

When the user completes the touch with the IC card 6 (S360) within 30 seconds, the in-vehicle apparatus 3 outputs a power source switch-on signal to the vehicle power source ECU 22 of the vehicle 4 to turn on the vehicle power source switch 25 (S370). In this state, the vehicle side ECU 23 of the vehicle 4 initiates a startup sequence (S380), and checks the position of the shift lever (S390). According to the present embodiment, the IC card 6 reading operation for authentication of identification ID, and the IC card 6 reading operation for turning on the vehicle power source switch 25 are performed as different reading operations. More specifically, the vehicle power source switch 25 is turned on when the IC card 6 reading operation for authentication and the subsequent IC card 6 reading operation for turning on the vehicle power source switch 25 are both performed.

Thereafter, the in-vehicle apparatus 3 transmits a signal of a vehicle system startup request to the vehicle side ECU 23 (S400). When receiving the signal of the vehicle system startup request, the vehicle side ECU 23 starts up the vehicle system, communicates with the vehicle communication portion 18 of the in-vehicle apparatus 3, and confirms that the power source switch-on signal has been output to the vehicle power source ECU 22 from the in-vehicle apparatus 3 (S410). A traveling mode of the vehicle 4 is started (S420) to allow traveling of the vehicle 4 by the user. When the traveling mode of the vehicle 4 is started in this state, the in-vehicle apparatus 3 outputs a voice message "Thank you for using.", and transmits check-in completion notification to the management apparatus 2 (S430). On the other hand, when the traveling mode of the vehicle 4 is not started, the in-vehicle apparatus 3 outputs a voice message "Vehicle is not available. Please contact attendant.", and transmits check-in abnormality notification to the management apparatus 2 (S440).

When the user checking portion 17 fails to read the IC card 6 in S310 or S360, a voice message "Please touch with IC card 6 again. Contact system manager (attendant) if reading does not start successively." is output. In this case, check-in abnormality notification is transmitted to the management apparatus 2.

When reservation information is not obtained at the time of inquiry of reservation information from the in-vehicle apparatus 3 to the management apparatus 2 in S320, a voice message "Abnormal communication with higher system. Please wait for a while." is output. In this case, an abnormality process is performed. When it is determined that the reservation information and the information read from the IC card 6 do not match with each other based on a collation result in S320, a voice message "Reservation is not confirmed. Vehicle is not available." is output. In this case, the abnormality process is performed. When a check-in request (touch with IC card 6) is issued before the reservation time in S320, a voice message "Before start of available time. Please wait until reservation time" is output. In this case, the process returns to the initial step of the check-in process (returns to S310).

When a second touch with the IC card 6 is not completed within 30 seconds in S340, a voice message "Timeout of check-in. Please touch with IC card 6 again." is output. In this case, the process returns to the initial step of the check-in process (return to S310). In other words, according to the present embodiment, the vehicle power source switch 25 is not turned on when the operation for reading the IC card 6 to start traveling is not performed within the set time from the time of the operation for reading the IC card 6 for collation of the reservation information.

Figure 7:
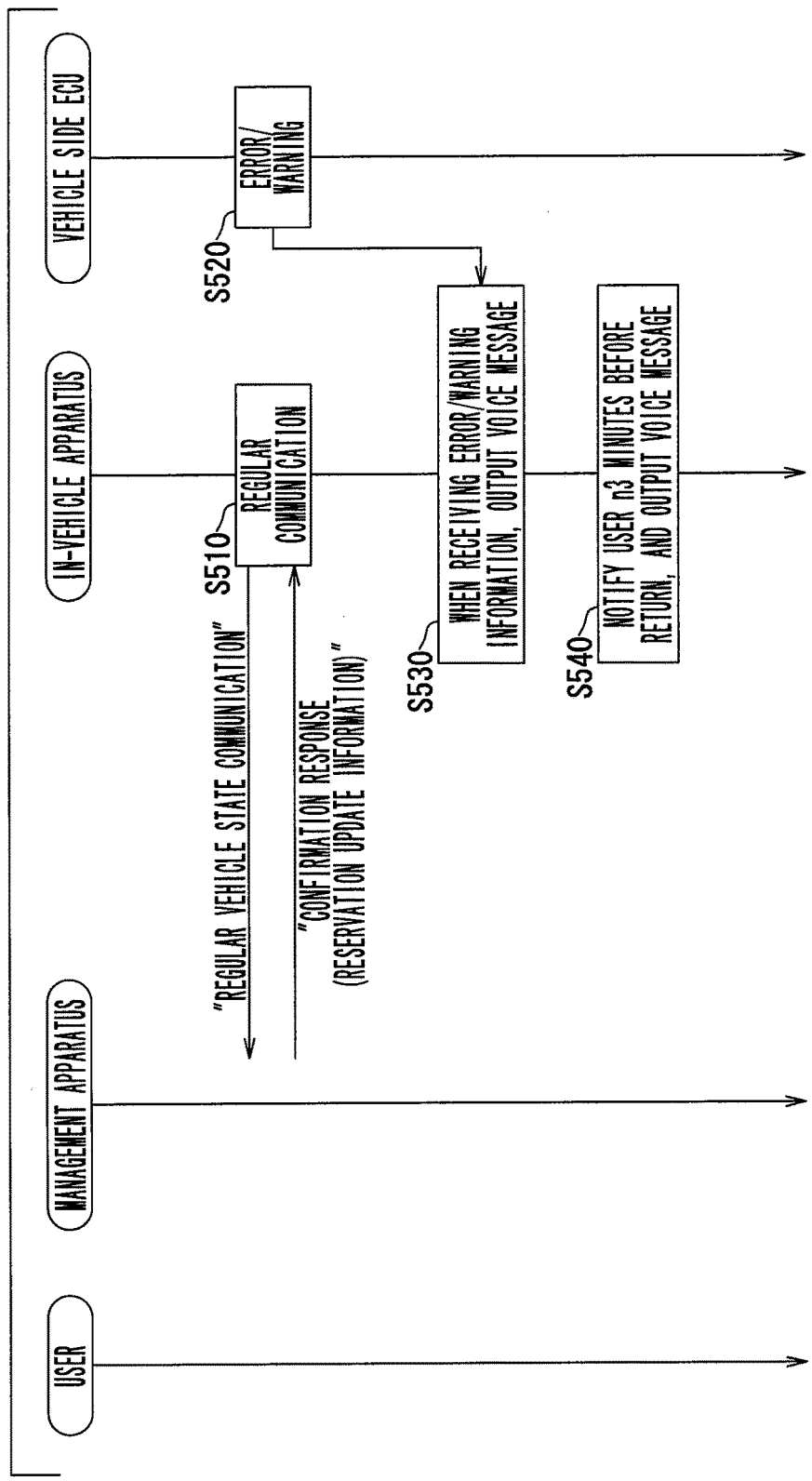
FIG. 7 is a diagram illustrating an operation during traveling of the vehicle.

FIG. 7 illustrates an operation during traveling of the vehicle 4. As illustrated in FIG. 7, the in-vehicle apparatus 3 transmits information about the vehicle state to the management apparatus 2 regularly (for each set time) during traveling of the vehicle 4 (S510). When receiving the information about the vehicle state, the management apparatus 2 transmits a signal of a confirmation response to the in-vehicle apparatus 3. When reservation update information is present, the management apparatus 2 transmits the reservation update information to the in-vehicle apparatus 3 in this step. Note that the in-vehicle apparatus 3 is configured to ignore the reservation update information received during traveling of the vehicle 4. When the in-vehicle apparatus 3 receives error/warning information from the vehicle side ECU 23 (S520), a voice message "Vehicle abnormal condition. Please contact attendant." is output. In this case, the abnormality process is performed (S530). In addition, when it is n3 minute(s) before a returning time of the vehicle 4, the in-vehicle apparatus 3 outputs a voice message "Returning time is approaching. Please move vehicle to returning station immediately." to give a prior notice to the user (S540).

Figure 8:
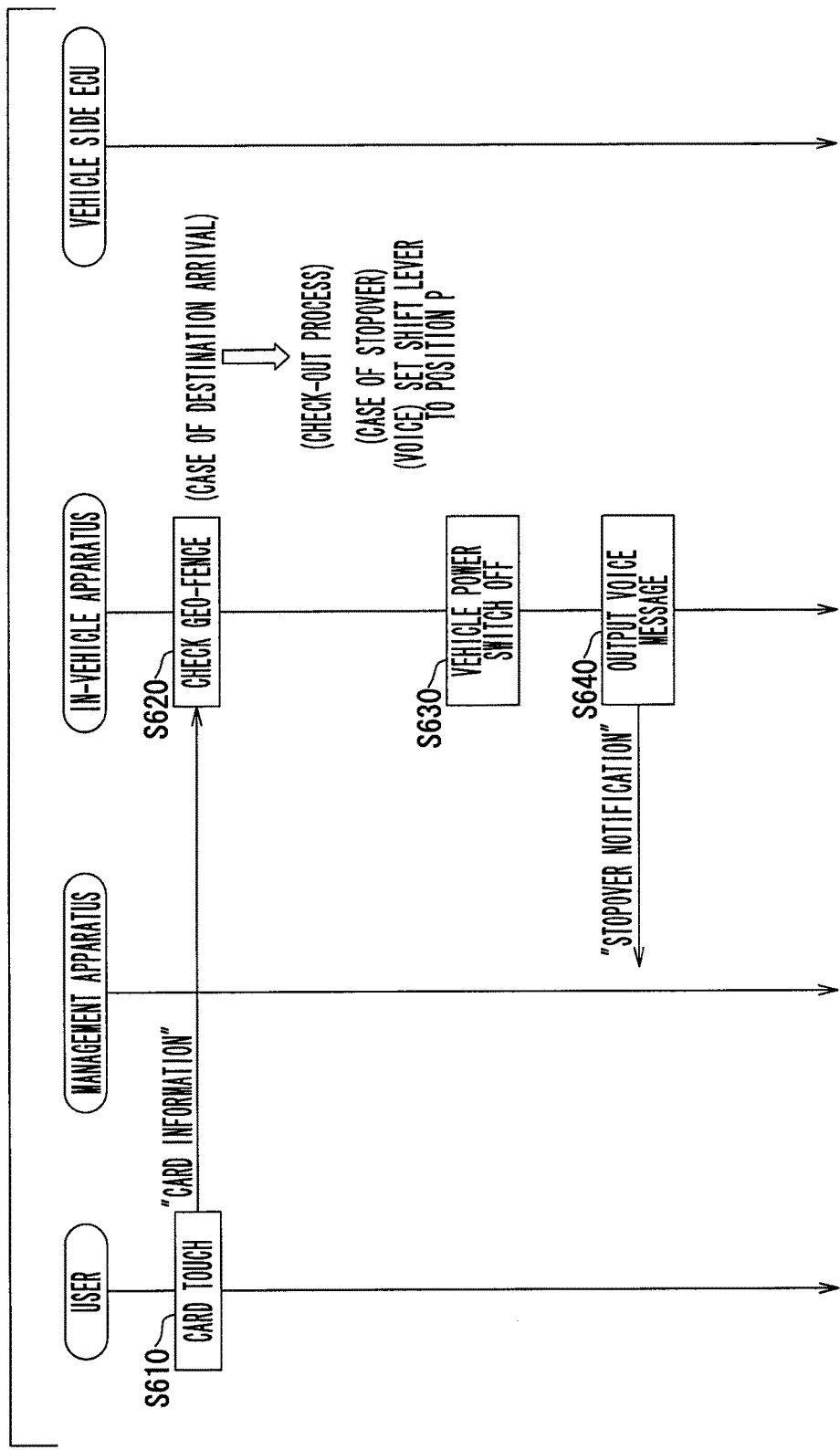
FIG. 8 is a diagram illustrating an operation at the time of a stopover of the vehicle.

FIG. 8 illustrates an operation at the time of a stopover of the vehicle 4. In this case, as shown in S610 in FIG. 6, the user stops the vehicle 4, and touches the user checking portion 17 (card reader) of the in-vehicle apparatus 3 in the vehicle 4 with the IC card 6. In response to this touch, the in-vehicle apparatus 3 reads the IC card 6 of the user, checks identification information, and checks a geo-fence of the station (S620). When arrival at a destination (geo-fence of returning station) is indicated by the geo-fence in this step, a check-out process described below is performed. Note that check-out refers to a series of procedures performed for the vehicle 4 and the car sharing system 1 to end use of the vehicle 4.

When the geo-fence indicates a stopover point (not geo-fence of returning station), the in-vehicle apparatus 3 outputs a voice message "Please set shift lever to P position", and then outputs a power source switch-off signal to the vehicle power source ECU 22 to turn off the vehicle power source switch 25 (S630). Thereafter, the in-vehicle apparatus 3 transmits a signal of stopover notification to the management apparatus 2, and outputs a voice message "Please touch with IC card again to restart driving." (S640).

Figure 9:
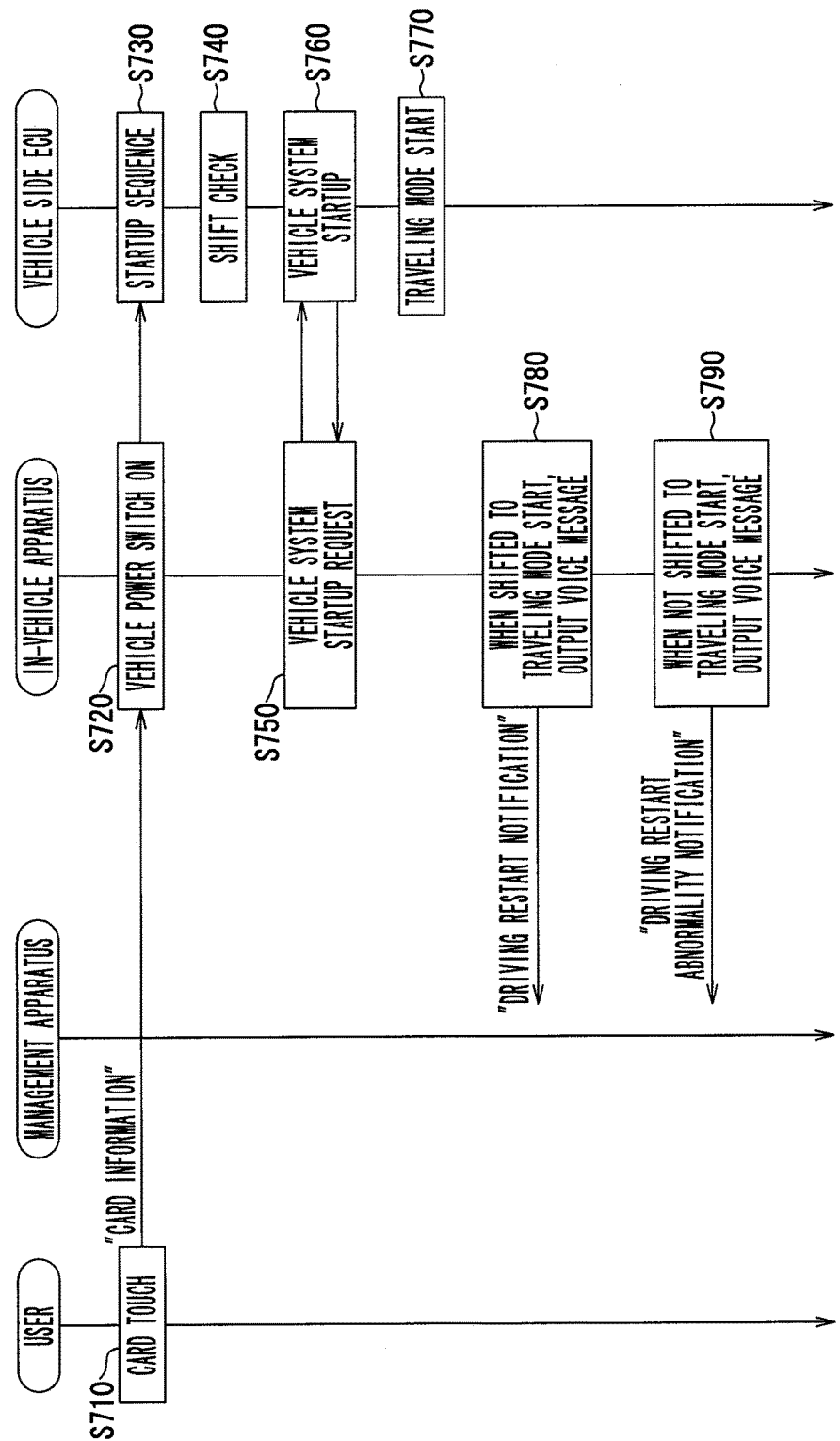
FIG. 9 is a diagram illustrating an operation for a driving restart of the vehicle.

FIG. 9 illustrates an operation performed at a restart of driving of the vehicle 4 after a stopover. As illustrated in FIG. 9, the user firstly touches the user checking portion 17 with the IC card 6 for restart of driving (S710). In this case, the in-vehicle apparatus 3 reads the IC card 6 of the user, checks identification information, and then outputs a power source switch-on signal to the vehicle power source ECU 22 to turn on the vehicle power source switch 25 (S720). As a result, a startup sequence is initiated by the vehicle side ECU 23 of the vehicle 4 (S730), and the position of the shift lever is checked (S740).

Subsequently, the in-vehicle apparatus 3 transmits a signal of a vehicle system startup request to the vehicle side ECU 23 (S750). When receiving the signal of the vehicle system startup request, the vehicle side ECU 23 starts up the vehicle system, communicates with the vehicle communication portion 18 of the in-vehicle apparatus 3, and confirms that the power source switch-on signal has been output from the in-vehicle apparatus 3 to the vehicle power source ECU 22 (S760). Following the confirmation, the traveling mode of the vehicle 4 is started (S770) to allow traveling of the vehicle 4 by the user. When the traveling mode of the vehicle 4 is started in this state, the in-vehicle apparatus 3 outputs a voice message "Thank you for using.", and transmits driving restart notification to the management apparatus 2 (S780). On the other hand, when the traveling mode of the vehicle 4 is not started, the in-vehicle apparatus 3 outputs a voice message "Vehicle is not available. Please contact attendant.", and transmits driving restart abnormality notification to the management apparatus 2 (S790).

When the user checking portion 17 fails to read the IC card 6 in step S710, a voice message "Please touch with IC card 6 again. Contact system manager (attendant) if reading does not start successively." is output. In this case, the driving restart abnormality notification is transmitted to the management apparatus 2.

Figure 10:
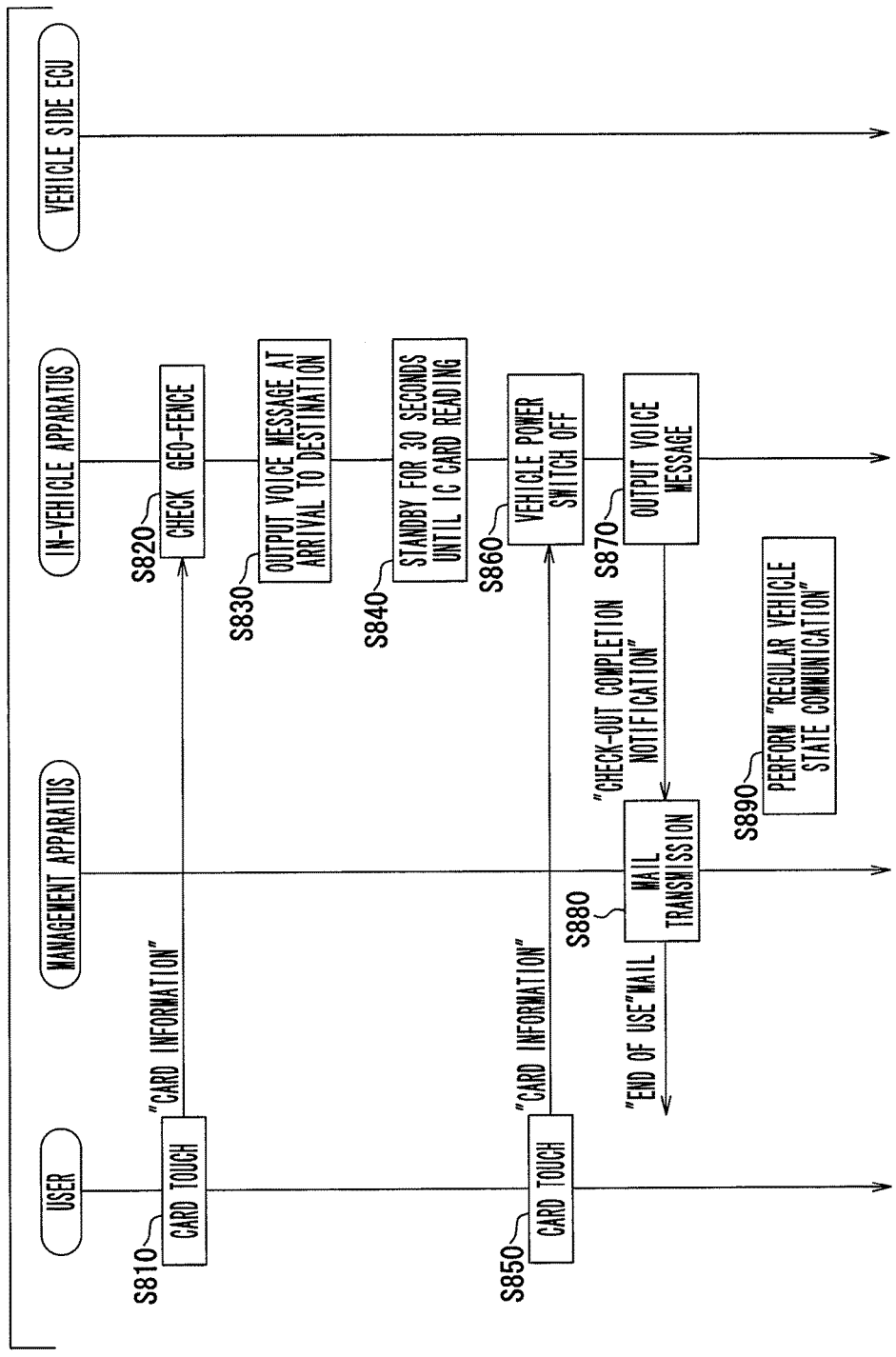
FIG. 10 is a diagram illustrating an operation for check-out from the vehicle by the user.

FIG. 10 illustrates an operation for check-out from the vehicle 4 performed by the user. As illustrated in FIG. 10, when the vehicle 4 arrives at a returning station and stops thereat, the user touches the user checking portion 17 with the IC card 6 for check-out (S810). In this case, the in-vehicle apparatus 3 reads the IC card 6 of the user and checks the identification, and then checks whether the vehicle 4 is positioned within the geo-fence of the returning station (S820). When the vehicle 4 arrives at the destination, that is, when it is confirmed that the vehicle 4 is positioned within the geo-fence of the returning station, a voice message "Checking out. Please set shift lever to P position." is output (S830).

Thereafter, a standby state continues for a set time such as 30 seconds until the user touches the user checking portion 17 (card reader) of the in-vehicle apparatus 3 with the IC card 6 (S840). When a touch (second touch) of the IC card 6 is completed within 30 seconds (S850), the in-vehicle apparatus 3 reads the IC card 6 of the user, checks identification information, and outputs a power source switch-off signal to the vehicle power source ECU 22 of the vehicle 4 to turn off the vehicle power source switch 25 (S860). Subsequently, the in-vehicle apparatus 3 outputs a voice message "Thank you for using.", and transmits check-out completion notification to the management apparatus 2 (S870). When receiving this check-out completion notification, the management apparatus 2 transmits an end of use mail to the user terminal 5 of the user (S880). Thereafter, the in-vehicle apparatus 3 is configured to transmit information about the vehicle state to the management apparatus 2 regularly (for each set time) until check-in by the next user (S890).

On the other hand, when the next touch of the IC card 6 is not completed within 30 seconds from the previous touch in S840, a voice message "Timeout of check-out. Please touch with IC card 6 again." is output. In this case, the process returns to the initial step of the check-out process (returns to S810).

Figure 11:
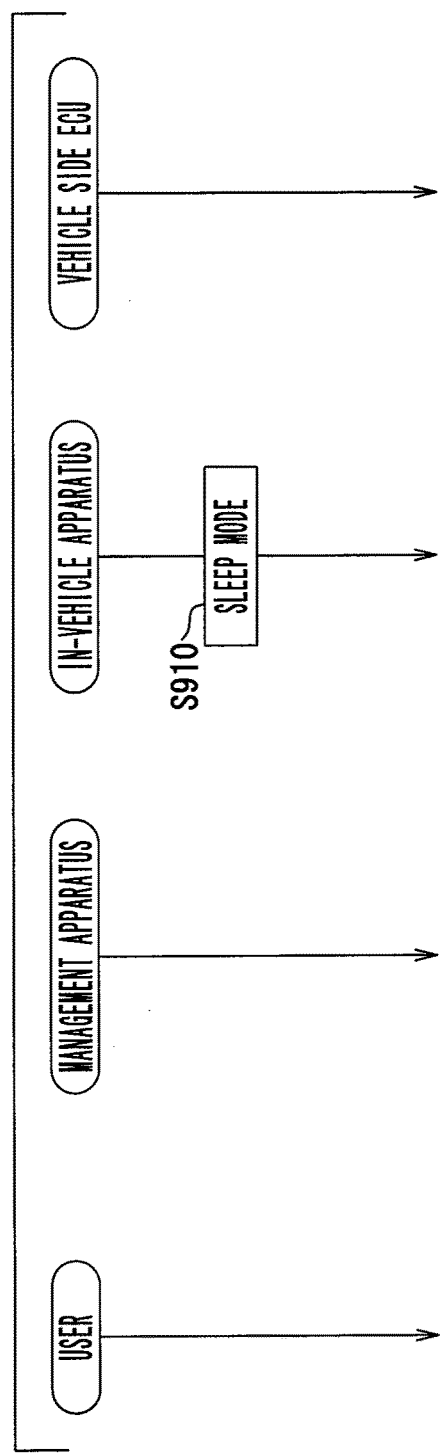
FIG. 11 is a diagram illustrating an operation for a close of business of the car sharing system.

FIG. 11 illustrates an operation performed at a close of business of the car sharing system. In this case, the in-vehicle apparatus 3 shifts to a sleep mode at the time of the close of business (S910 in FIG. 11). As a result, the in-vehicle apparatus 3 is brought into an operation mode (sleep mode) for supplying minimum power necessary for rising to the control portion 19 and the like. In this case, there are set, for the in-vehicle apparatus 3, rising times including a time before a set time for business start next morning, and multiple times for rising (nighttime rising) for regularly transmitting information about the vehicle state to the management apparatus 2 during nighttime.

Figure 12:
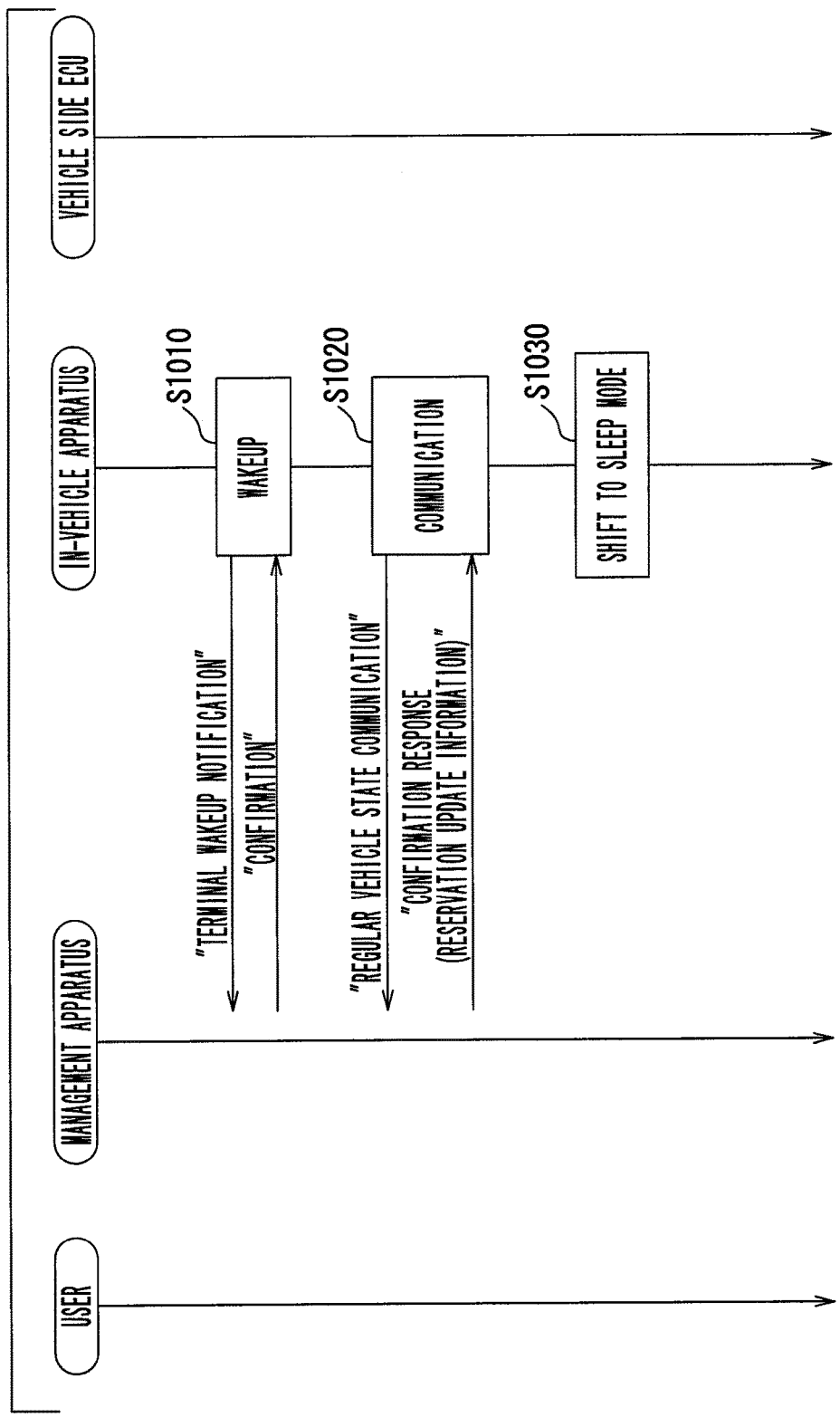
FIG. 12 is a view illustrating an operation performed when the in-vehicle apparatus rises during nighttime.

FIG. 12 illustrates an operation at the time of rising of the in-vehicle apparatus 3 during nighttime. In this case, the in-vehicle apparatus 3 rises by shifting from the sleep mode to the normal operation mode at the time of the rising time during nighttime, and transmits a signal of terminal rising notification to the management apparatus 2 (S1010 in FIG. 12). When receiving the signal of terminal rising notification from the in-vehicle apparatus 3, the management apparatus 2 transmits a signal of terminal rising notification confirmation to the in-vehicle apparatus 3.

Subsequently, the in-vehicle apparatus 3 transmits information about the vehicle state immediately after rising (nighttime) to the management apparatus 2 (S1020). When receiving information about the vehicle state from the in-vehicle apparatus 3, the management apparatus 2 transmits a signal of a reception confirmation response (information which contains information indicating the necessity to update reservation information when new reservation information is present) to the in-vehicle apparatus 3. Note that the in-vehicle apparatus 3 performs nothing during nighttime even when information indicating the necessity to update reservation information is received. Thereafter, the in-vehicle apparatus 3 shifts to the sleep mode (S1030).

Figure 13:
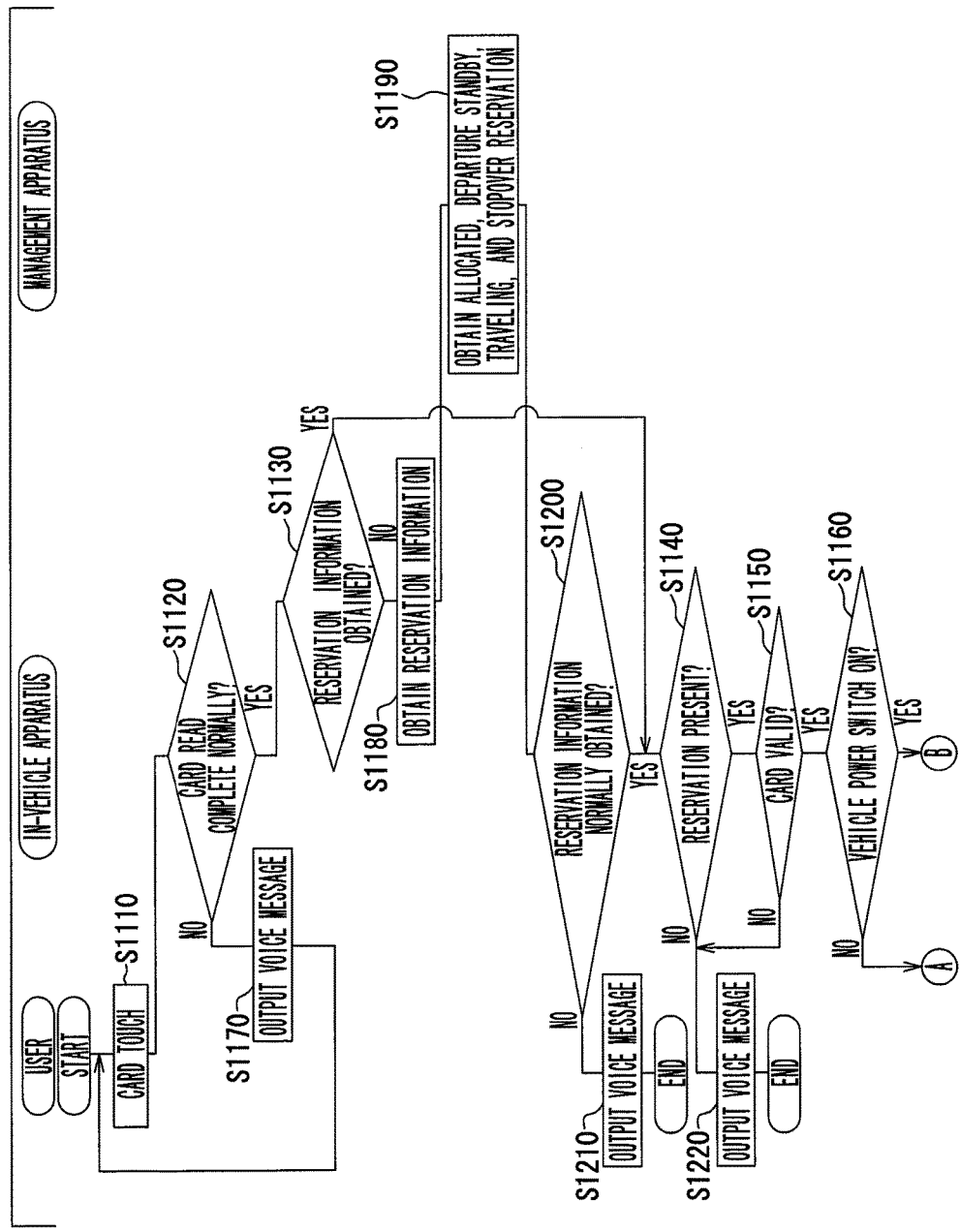
FIG. 13 is a flowchart showing a control for a first touch for touching a user checking portion with an IC card by the user.

Controls for realizing the respective operations of the car sharing system 1 described above are hereinafter described with reference to FIGS. 13 to 17. Firstly, a flowchart in FIG. 13 shows controls performed when the user checking portion 17 (card reader) of the in-vehicle apparatus 3 provided within the vehicle 4 is touched by the user with the IC card 6. Note that the vehicle 4 is in a stop state when these controls are performed.

When the IC card 6 is read by the user checking portion 17 of the in-vehicle apparatus 3 in S1110 in FIG. 13, the process proceeds to S1120 to determine whether or not reading of the IC card 6 has been normally completed. When it is determined that reading of the IC card 6 has been normally completed in this step ("YES" in S1120), the process proceeds to S1130 to determine whether or not reservation information has been obtained by the in-vehicle apparatus 3. When it is determined that the reservation information has been obtained ("YES" in S1130), the process proceeds to S1140 to determine whether or not reservation of this user (identification ID) is present.

When it is determined that reservation of the user is present ("YES" in S1140), the process proceeds to S1150 to determine whether or not the IC card 6 is valid. When it is determined that the IC card 6 is valid ("YES" in S1150), the process proceeds to S1160 to determine whether or not the vehicle power source switch 25 has been turned on. When it is determined that the vehicle power source switch 25 has been turned off ("NO" in S1160), the process proceeds to control A (see flowchart in FIGS. 14 and 15). When it is determined that the vehicle power source switch 25 has been turned on ("YES" in S1160), the process proceeds to control B (see flowchart in FIGS. 16 and 17). Specific contents of the controls A and B will be described below.

On the other hand, when it is determined that reading of the IC card 6 has not been normally completed ("NO" in S1120), the process proceeds to S1170 to output a voice message "Please touch with IC card 6 again, or contact system manager". Thereafter, the process returns to S1110.

When it is determined that reservation information has not been obtained ("NO" in S1130), the process proceeds to S1180 to obtain reservation information through communication with the management apparatus 2. Thereafter, the process proceeds to S1190, where the management apparatus 2 obtains reservation information about the specified vehicle 4. The reservation information to be obtained contains allocated information, and reservation of departure standby, traveling, and a stopover. In this case, the management apparatus 2 transmits, to the in-vehicle apparatus 3, information about reservation ID, information about identification ID of the IC card 6, information about identification and geo-fence of the departing station, information about identification and geo-fence of the arriving (returning) station, information about desired check-in time, information about desired check-out time, information about the type of the IC card 6, information about identification ID of the user, and the like.

Thereafter, the process proceeds to S1200, where the in-vehicle apparatus 3 determines whether or not the reservation information has been normally obtained. When it is determined that the reservation information has been normally obtained ("YES" in S1200), the process proceeds to S1140. Processing after this step is similar to the processing described above. When it is determined that the reservation information has not been normally obtained ("NO" in step 1200), the process proceeds to S1210. In S1210, a voice message "Please contact system manager" is output. In this case, the process ends after completion of the abnormality process.

When it is determined that reservation of the user is not present ("NO" in S1140), the process proceeds to S1220. In S1220, a voice message "No valid reservation." is output. The process ends after the output of this message.

Figure 14:
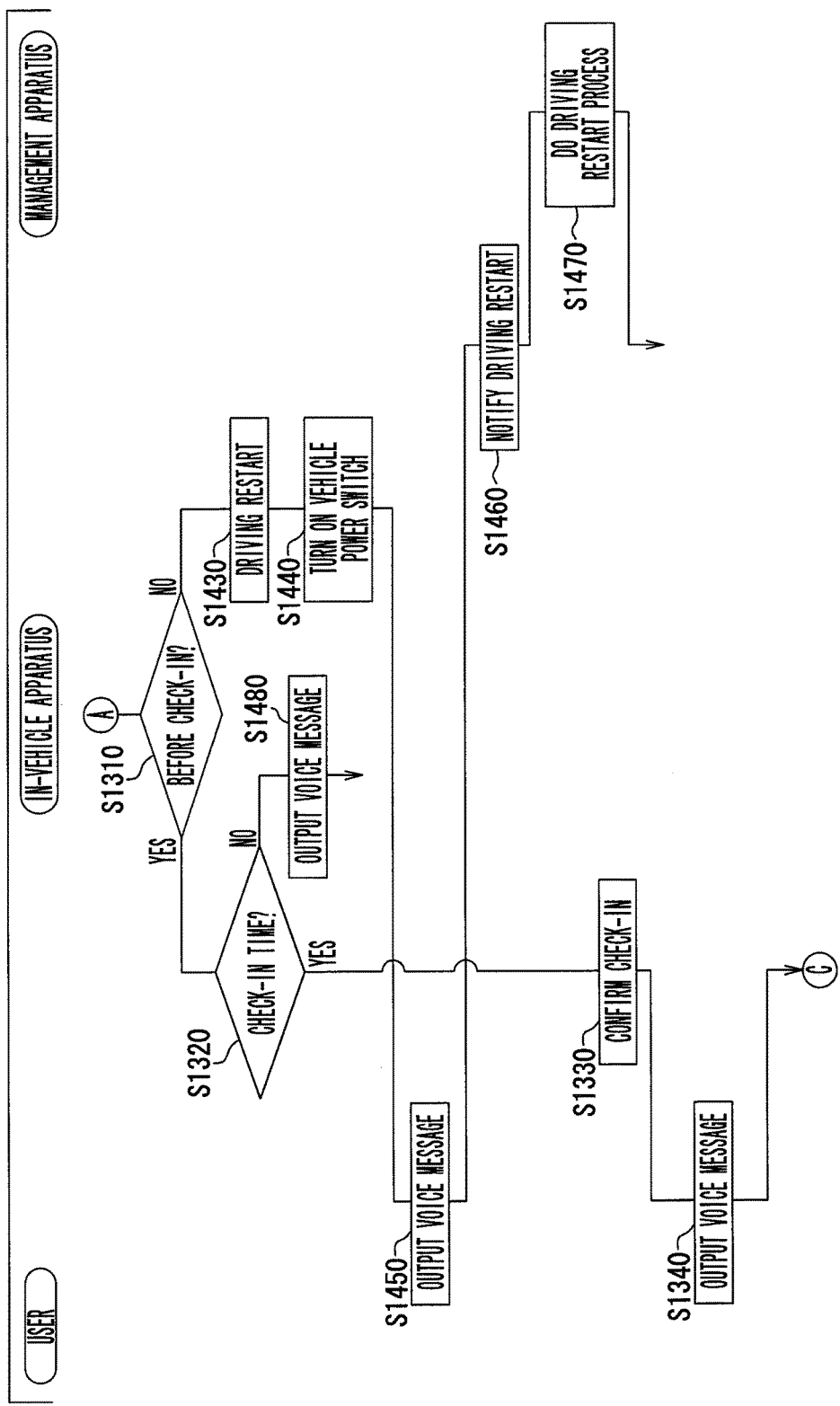
FIG. 14 is a flowchart of a check-in process in an example.

The control A (check-in process) is hereinafter described with reference to FIGS. 14 and 15. In S1310 in FIG. 14, the in-vehicle apparatus 3 determines whether or not the current state is a pre-check-in state. When it is determined that the current state is a pre-check-in state ("YES" in S1310), the process proceeds to S1320 to determine whether or not the current time is a check-in time. When it is determined that the current time is the check-in time ("YES" in S1320), the process proceeds to S1330 to confirm check-in. Thereafter, the process proceeds to S1340 to output a voice message "Please touch with IC card 6 again within 30 seconds for check-in."

Figure 15:
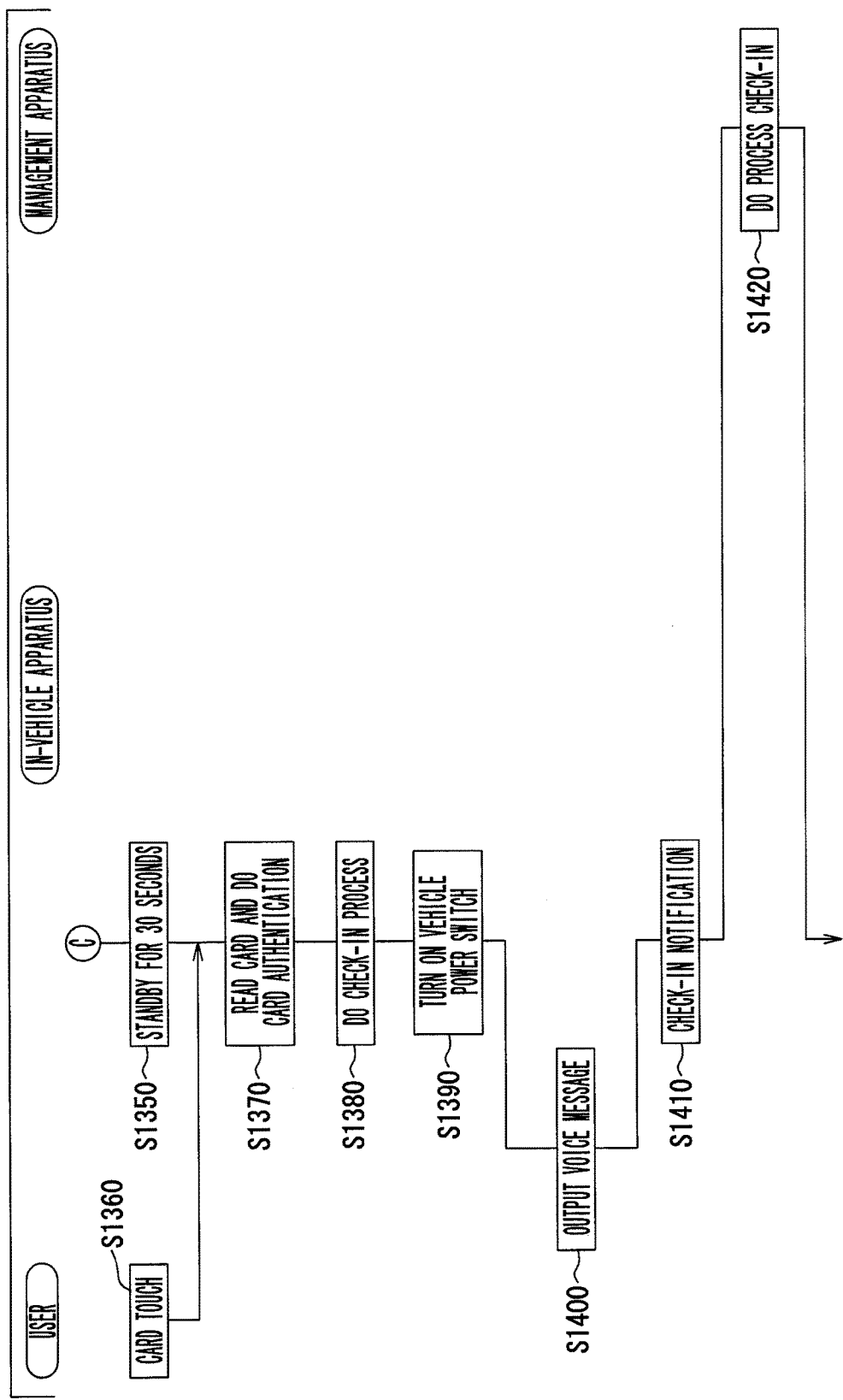
FIG. 15 is a flowchart of the check-in process in another example.

Thereafter, the process proceeds to S1350 in FIG. 15, where a standby state continues for 30 seconds until the user checking portion 17 is touched with the IC card 6. When a touch with the IC card 6 is not completed within 30 seconds, a voice message "Timeout of check-in. Please touch with IC card 6 again" is output. In this case, the process returns to the initial step of the check-in process (standby for first touch with IC card 6, S1110 in FIG. 13).

When the user touches with the IC card 6 within 30 seconds as described above, the process proceeds to S1370 to read the IC card 6 and perform card authentication. Thereafter, the process proceeds to S1380 to perform the check-in process. Subsequently, the process proceeds to S1390 to turn on the vehicle power source switch 25. The process further proceeds to S1400 to output a voice message "Thank you for using. You can start up vehicle.", and then proceeds to S1410 to transmit check-in notification to the management apparatus 2. The process further proceeds to S1420, where the management apparatus 2 receives check-in notification from the in-vehicle apparatus 3, and performs the check-in process. Thereafter, traveling of the vehicle 4 by the user is initiated in a standby state for a touch of the IC card 6.

On the other hand, when it is determined that the current state is a post-check-in state ("NO" in S1310), the process proceeds to S1430 to perform a process for restarting driving of the vehicle 4. Subsequently, the process proceeds to S1440 to turn on the vehicle power source switch 25, and further proceeds to S1450 to output a voice message "You can start up vehicle". Thereafter, the process proceeds to S1460 to transmit driving restart notification to the management apparatus 2. The process further proceeds to S1470, where the management apparatus 2 receives the driving restart notification from the in-vehicle apparatus 3, and performs a driving restart process. Thereafter, traveling of the vehicle 4 by the user is initiated in a standby state for a touch of the IC card 6.

When it is determined that the current time is not the check-in time ("NO" in S1320), the process proceeds to S1480 to output a voice message "XX minutes before use". Thereafter, the process returns to the standby state for a touch with the IC card 6 (S1110 in FIG. 13).

Figure 16:
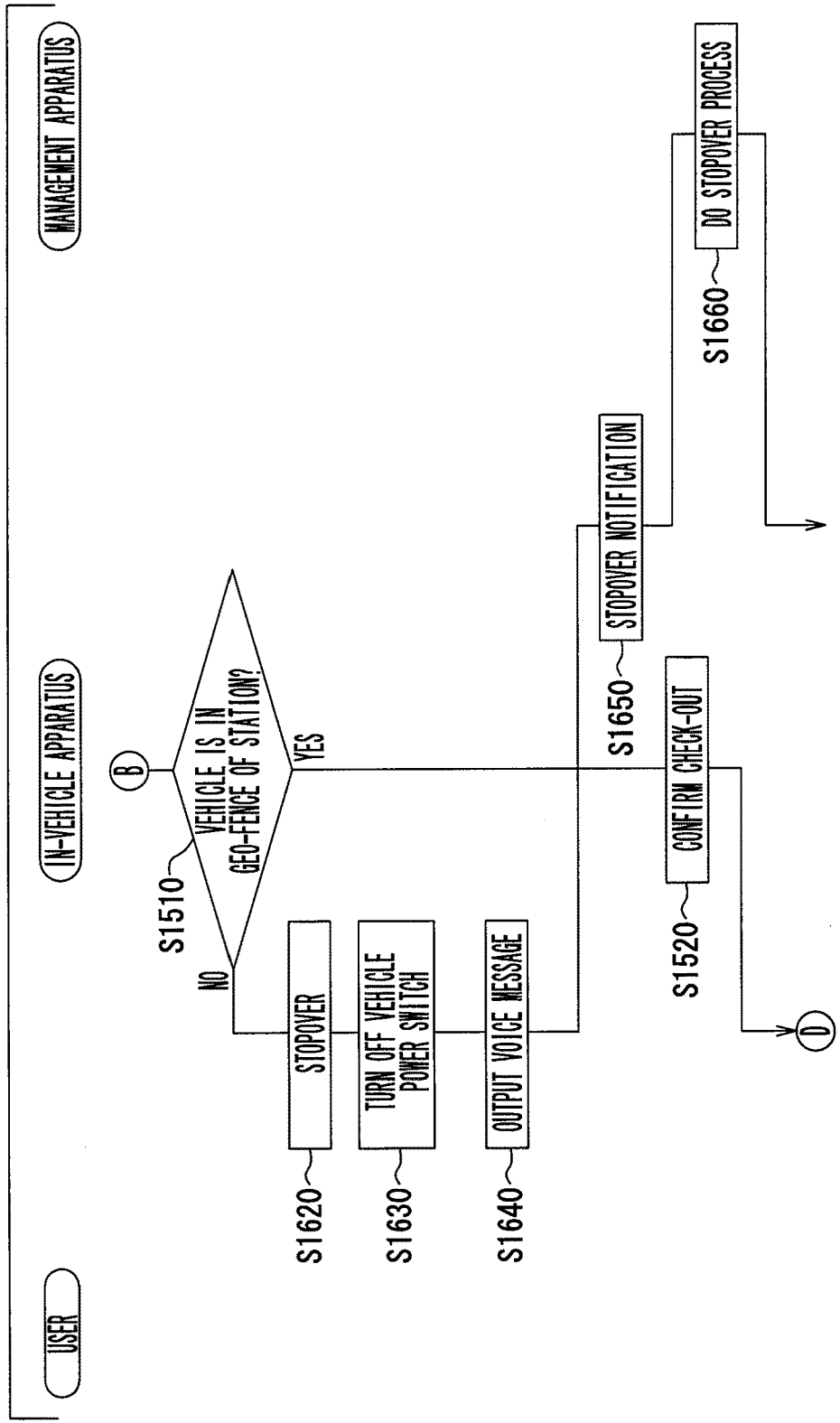
FIG. 16 is a flowchart of a check-out process in an example.
Figure 17:
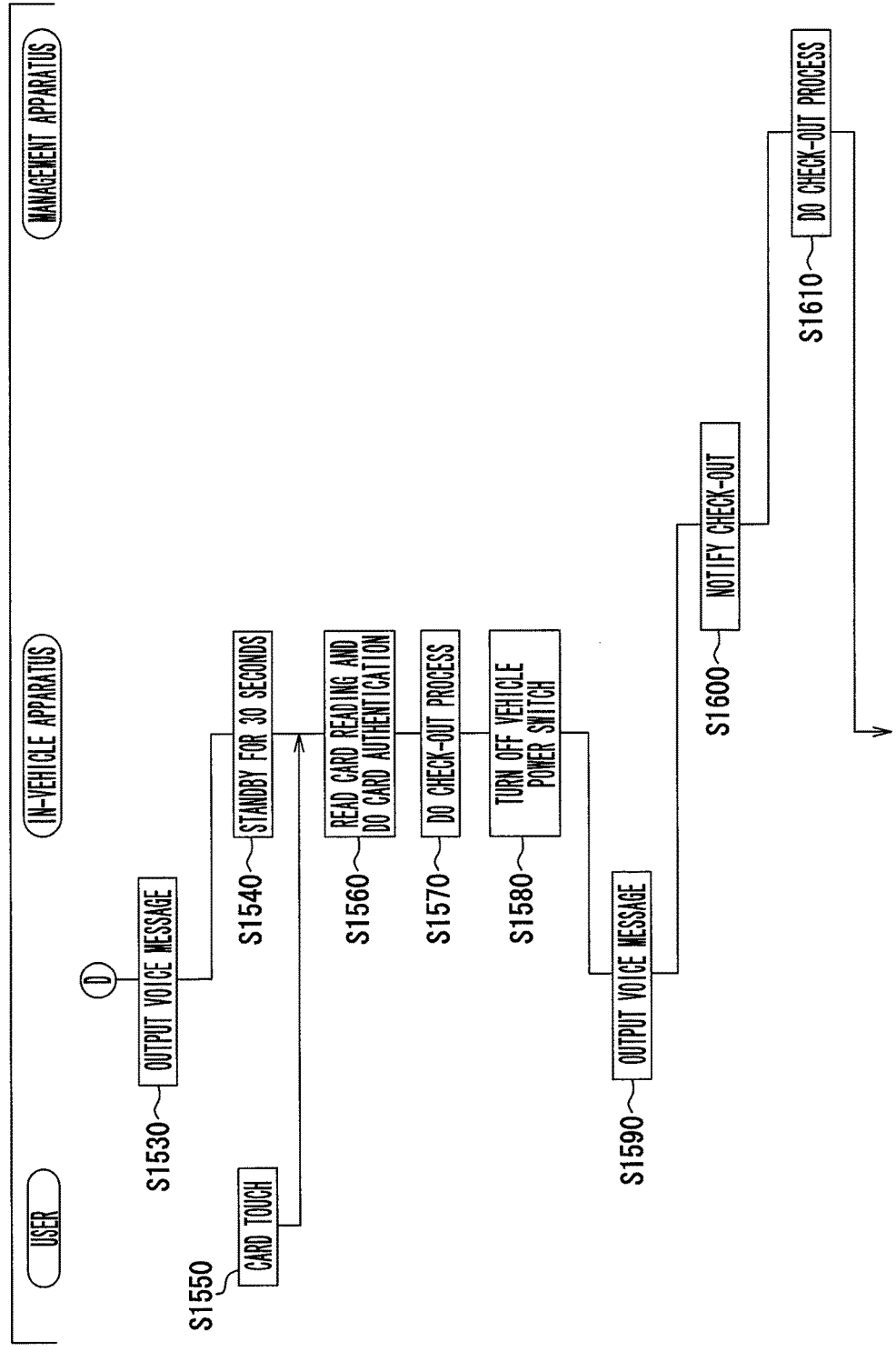
FIG. 17 is a flowchart of the check-out process in another example.

The control B (check-out process) is hereinafter described with reference to FIGS. 16 and 17. In S1510 in FIG. 16, the in-vehicle apparatus 3 determines whether or not the vehicle 4 is positioned within the geo-fence of the station. When it is determined that the vehicle 4 is positioned within the geo-fence ("YES" in S1510), the process proceeds to S1520 to confirm check-out. Thereafter, the process proceeds to S1530 in FIG. 17 to output a voice message "Please touch with IC card again for check-out. Vehicle will stop if reading of IC card does not start within 30 seconds".

Thereafter, the process proceeds to S1540, where a standby state continues for 30 seconds until the user checking portion 17 is touched with the IC card 6. When a touch with the IC card 6 is not completed within 30 seconds, the process proceeds to S1620 in FIG. 16 for a stopover of the vehicle 4. When a touch with the IC card 6 is completed by the user within 30 seconds, the process proceeds to S1560 to read the IC card 6 and perform card authentication. Subsequently, the process proceeds to S1570 to perform the check-out process. The process further proceeds to S1580 to turn off the vehicle power source switch 25. Thereafter, the process proceeds to S1590 to output a voice message "Thank you for using. We look forward to seeing you again.", and further proceeds to S1600 to transmit check-out notification to the management apparatus 2. The process further proceeds to S1610, where the management apparatus 2 receives check-out notification from the in-vehicle apparatus 3, and performs the check-out process. Thereafter, the process returns to the standby state for a touch with the IC card 6 (S1110 in FIG. 13).

On the other hand, when it is determined that the vehicle 4 is not located within the geo-fence of the station ("NO" in S1510), the process proceeds to S1620. In S1620, a stopover process during use of the vehicle 4 is performed. Firstly, the process proceeds to S1630 to turn off the vehicle power source switch 25, and further proceeds to S1640 to output a voice message "Vehicle is stopped. Please touch with IC card again for restart of driving". Thereafter, the process proceeds to S1650, where the in-vehicle apparatus 3 transmits stopover notification to the management apparatus 2. The process further proceeds to S1660, where the management apparatus 2 receives the stopover notification from the in-vehicle apparatus 3, and performs the stopover process. Thereafter, the process returns to the standby state for a touch with the IC card 6 (S1110 in FIG. 13).

According to the present embodiment thus configured, the IC card 6 of the user is read by the user checking portion 17 of the in-vehicle apparatus 3. The check-in process of the vehicle 4 is performed to turn on the vehicle power source switch 25 based on collation between read identification ID and reservation information obtained from the management apparatus 2 for authentication of the identification ID. In this case, the necessity of a key box and a start key required by the conventional configuration is eliminated. According to the present embodiment, therefore, manufacturing cost becomes lower than that of the conventional configuration.

In addition, according to the present embodiment, reading of the IC card 6 for authentication of identification ID, and reading of the IC card 6 for turning on the vehicle power source switch 25 are performed as different reading operations. In this case, system security and vehicle safety are improved. Particularly, the vehicle power source switch 25 is turned on only when the reading operation of the IC card 6 for authentication and the subsequent reading operation of the IC card 6 for turning on the vehicle power source switch 25 are both performed. Accordingly, system security and vehicle safety are further improved.

Moreover, according to the present embodiment, the vehicle power source switch 25 is not turned on when the reading operation of the IC card 6 for starting traveling is not performed within a set time (such as 30 seconds) since the reading time of the IC card 6 for collation with reservation information. Accordingly, the vehicle power source switch 25 is prevented from being turned on when the user checking portion 17 is touched with the IC card 6 as a result of an erroneous operation.

Furthermore, according to the present embodiment, it is determined that the vehicle 4 is in the state of a stopover when the stop position of the vehicle 4 is not located within the geo-fence of the station. In this case, the vehicle power source switch 25 is turned off based on this determination. Accordingly, a stopover of the vehicle 4 during car sharing is accurately determined.

Furthermore, according to the present embodiment, the user is asked to conduct confirmation (notification) of check-out when the stop position of the vehicle 4 is located within the geo-fence of the station. In this case, an intention of the user (intention of stopover or check-out) is clearly confirmed. In addition, according to the present embodiment, the check-out process of the vehicle 4 is not performed when the reading operation of the IC card 6 of the user is not performed by the user checking portion 17 within the set time (such as 30 seconds) after the confirmation of check-out for the user. Accordingly, check-out is prevented when the user desires a stopover.

Furthermore, according to the present embodiment, the vehicle power source switch 25 is turned on when read identification ID is authenticated after the reading operation of the IC card 6 of the user performed by the user checking portion 17 in the check-in state of the vehicle 4. Accordingly, a restart of driving of the vehicle 4 is reliably performed by the user after the stopover.

Furthermore, according to the present embodiment, the vehicle 4 is not allowed to travel by the vehicle side ECU 23 when a control signal for turning on the vehicle power source switch 25 is not output from the control portion 19 of the in-vehicle apparatus 3 in the on-state of the vehicle power source switch 25. Accordingly, robbery of the vehicle 4 can be prevented. In this case, the vehicle side ECU 23 is configured to give notification that the vehicle 4 is not allowed to travel when the vehicle 4 is in this condition. Thus, the user can recognize the reason why the vehicle 4 does not travel even in the on-state of the vehicle power source switch 25.

According to the present embodiment, the vehicle power source ECU 22 provided on the vehicle 4 is configured to turn on or off the vehicle power source switch 25 when the vehicle power source ECU 22 receives a power source switch-on signal or a power source switch-off signal from the in-vehicle apparatus 3 (control portion 19). Alternatively, the vehicle power source ECU 22 may not be provided, and the vehicle power source switch 25 may be directly turned on or off by the in-vehicle apparatus 3 (control portion 19). Particularly, this configuration is more preferable when the vehicle 4 is an electric car.

FIGS. 18 to 22C illustrate a second embodiment of the present disclosure. Note that configurations similar to the corresponding configurations of the first embodiment have been given similar reference numbers. According to the second embodiment, the user not carrying the IC card 6 calls an operator of a management center (such as manager and staff of car sharing system 1) via a cellular phone or the like to ask the operator to perform the check-in process and the check-out process of the vehicle 4 by using an external terminal. Note that the operator may be at the reservation management center, that is, the management center may be the same facility as the reservation management center, or may be a different facility.

Figure 18:
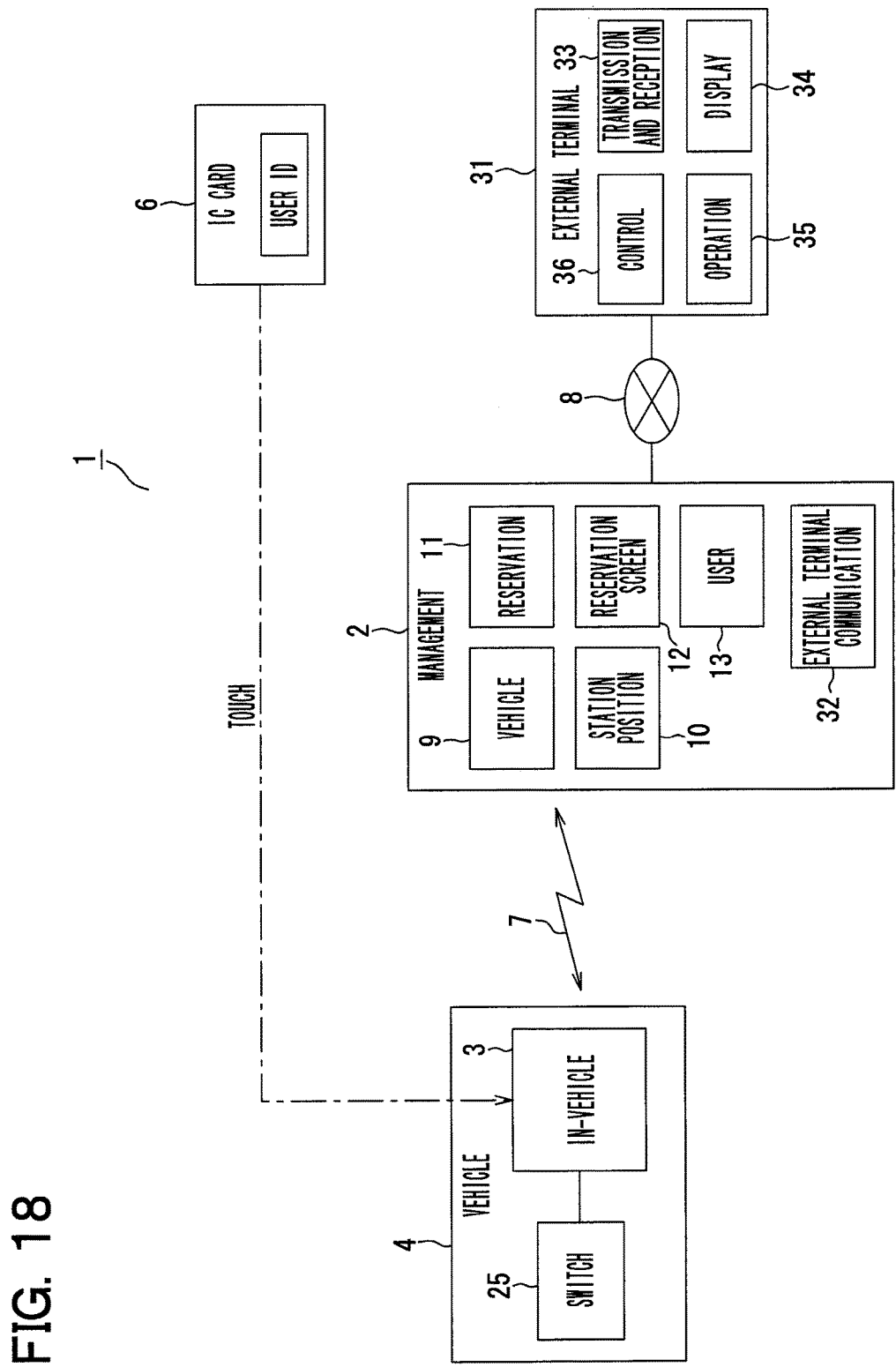
FIG. 18 is a block diagram illustrating a general schematic configuration of a car sharing system according to a second embodiment of the present disclosure.

As illustrated in FIG. 18, there are provided an external terminal 31 operated by the operator, and an external terminal communication portion 32 included in the management apparatus 2 of the reservation management center and having a function of communicating with the external terminal 31 via the communication network 8 such as a cellular phone communication network and the Internet, a LAN, or the like. The external terminal 31 is configured by a smartphone, a personal computer, or the like. While not shown in FIG. 18, the user terminal 5 for reservation similar to the user terminal 5 of the first embodiment (see FIG. 1) is provided in the second embodiment.

The external terminal 31 includes an external terminal side transmission and reception portion 33, an external terminal side display portion 34, an operation portion 35, and an external terminal side control portion 36. The external terminal side transmission and reception portion 33 has a function of communicating with the management apparatus 2 at the reservation management center via the communication network 8, the LAN, or the like. The external terminal side display portion 34 is configured by a liquid crystal display or the like, and displays characters and images. The operation portion 35 is configured by a touch panel, a keyboard, or the like. The external terminal side control portion 36 has a function of controlling the overall operation of the external terminal 31, and controls each of the external terminal side transmission and reception portion 33, the external terminal side display portion 34, and the operation portion 35.

Figure 19:
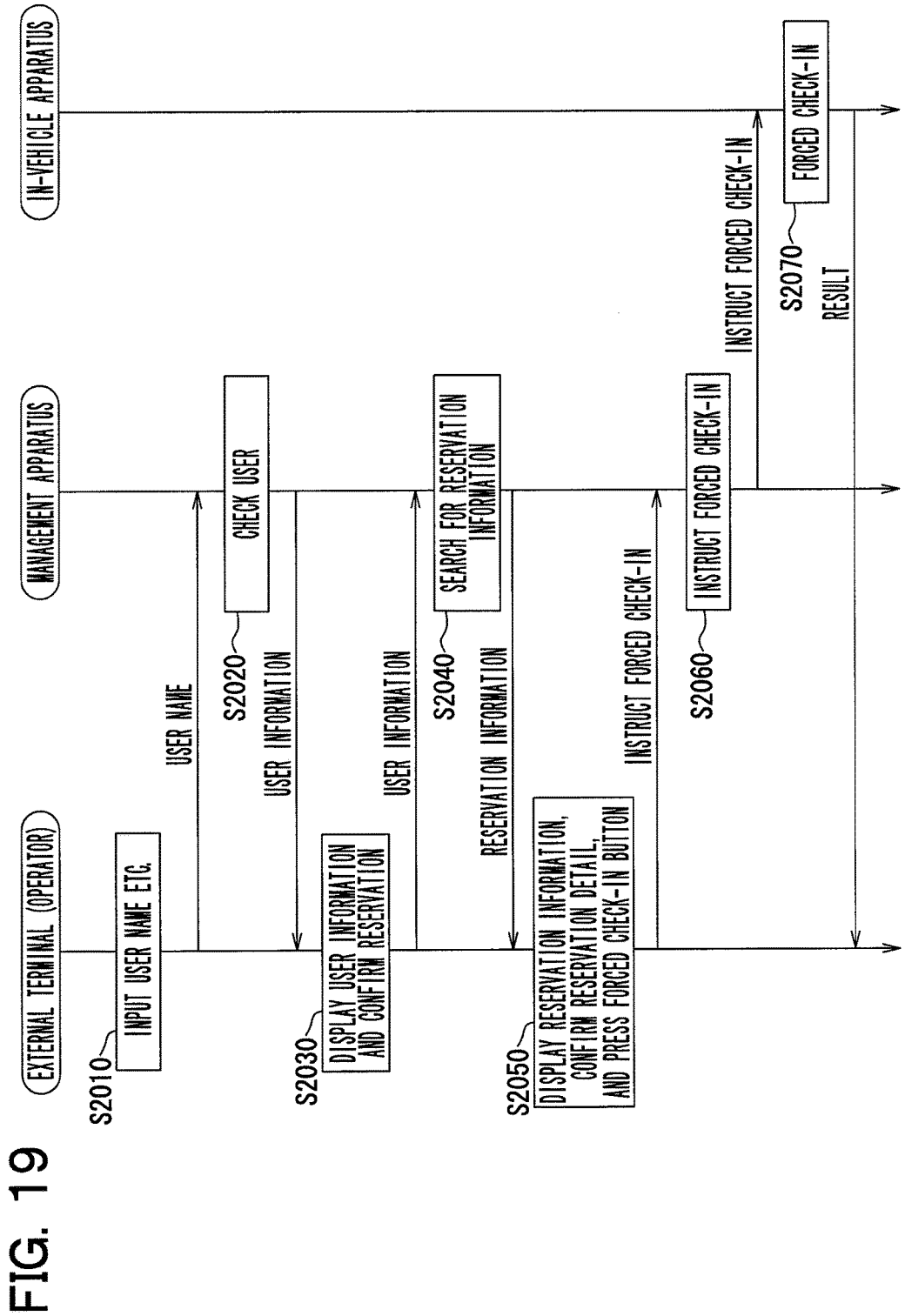
FIG. 19 is a diagram illustrating an operation for forced check-in to the vehicle by the user.

Discussed hereinbelow with reference to FIG. 19 is an operation for check-in to the vehicle 4 (that is, forced check-in to vehicle 4 without use of IC card 6) by the operator using the external terminal 31 while the user communicates with the operator via a cellular phone or the like.

In this case, the user firstly asks the operator at the management center to perform processing for check-in to the vehicle 4 via a cellular phone or the like. In this case, the operator obtains information such as the name of the user (information including birth date, address, driver's license number, identification ID or the like) from the user on the phone, starts up a program of the external terminal 31 for forced check-in to the vehicle 4 (such as application and browser), and manually inputs the information such as the name of the user. In response to this input, the external terminal 31 transmits the information such as the name of the user to the management apparatus 2 at the reservation management center (S2010).

Subsequently, the management apparatus 2 checks whether or not the user is a member registered in a member database or the like (proper user) based on information such as the name of the user thus received (S2020). In this case, the management apparatus 2 searches the member database based on the information such as the name of the user. When it is determined that the user is a proper user, the user information is output as a member search result, and further transmitted to the external terminal 31 from the management apparatus 2.

Thereafter, the process proceeds to S2030, where the external terminal 31 displays the received user information on the external terminal side display portion 34 (see FIG. 22A). With this display, the operator performs an operation for checking reservation of the user. In this case, the operator selects (clicks) the name of the user on the screen in FIG. 22A. Based on this selection, the external terminal 31 transmits the user information to the management apparatus 2.

The management apparatus 2 having received the user information searches for reservation information of the vehicle based on the user information, and transmits the obtained reservation information (reservation list and use result) to the external terminal 31 (S2040).

Subsequently, the process proceeds to S2050, where the external terminal 31 displays the received reservation information (reservation list and use result) on the management apparatus 2 (see FIG. 22B). With this display, the operator performs an operation for checking reservation of the user. In this case, the operator selects (clicks) the name of the user on the screen in FIG. 22A. Based on this selection, the external terminal 31 displays detailed reservation information about the user on the external terminal side display portion 34 (see FIG. 22C). A screen illustrated in FIG. 22C includes a forced check-in button 37. In this state, the operator operates the forced check-in button 37 to perform the forced check-in process of the vehicle 4. In response to this operation, the external terminal 31 transmits first instruction information to the management apparatus 2 to instruct the forced check-in process of the vehicle 4.

Subsequently, the process proceeds to S2060, where the management apparatus 2 having received the first instruction information from the external terminal 31 transmits second instruction information to the in-vehicle apparatus 3 of the vehicle 4 to instruct the forced check-in process of the vehicle 4.

Thereafter, the process proceeds to S2070, where the in-vehicle apparatus 3 of the vehicle 4 having received the second instruction information from the management apparatus 2 performs the check-in process of the vehicle 4. The process further proceeds to S370 in FIG. 6 to turn on the vehicle power source switch 25. Subsequently, processing from S380 to S420 in FIG. 6 is performed to allow traveling of the vehicle 4 by the user. Note that, when the forced check-in process of the vehicle 4 is completed, check-in completion notification is transmitted from the in-vehicle apparatus 3 to the management apparatus 2, and the check-in completion notification is further transmitted from the management apparatus 2 to the external terminal 31.

Figure 20:
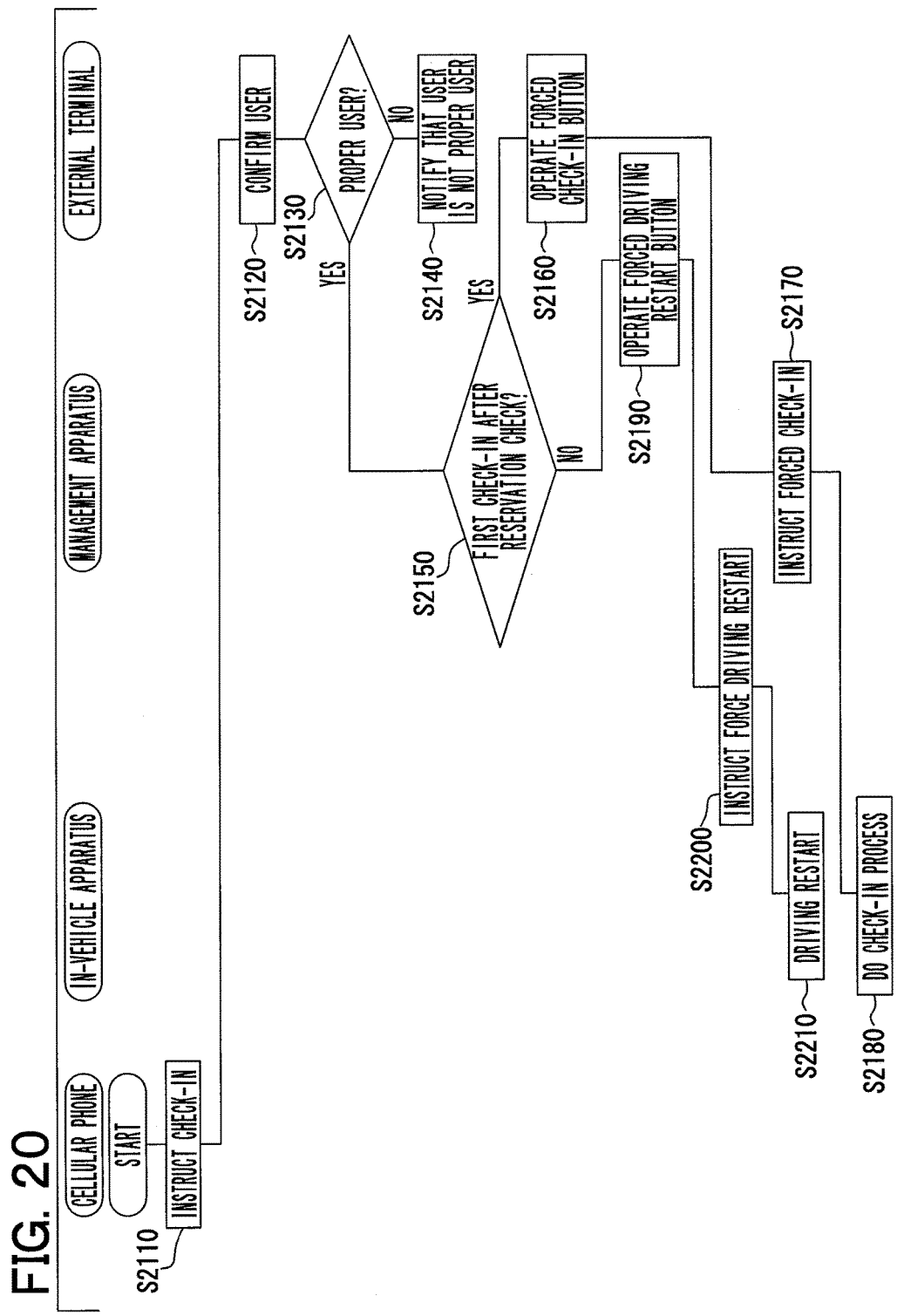
FIG. 20 is a flowchart of a forced check-in process.

A control for realizing an operation of forced check-in to the vehicle 4 discussed above is hereinafter described with reference to a flowchart shown in FIG. 20. In S2110 in FIG. 20, the user firstly asks (gives instruction to) the operator to perform forced check-in to the vehicle 4 on the cellular phone.

Subsequently, the process proceeds to S2120, where the operator checks whether the user is a proper user, for example, by using the external terminal 31. When it is determined that the user is not a proper user ("NO" in S2130), the process proceeds to S2140. In this case, the operator tells the user that the user is not a proper user (not registered as member) on the phone, and ends the check-in process without completion.

When it is determined that the user is a proper user ("YES" in S2130), the process proceeds to S2150, where the management apparatus 2 checks detailed reservation information about the user, and determines whether or not the current state is initial check-in. When it is determined that the current state is the initial check-in ("YES" in S2150), the process proceeds to S2160. In this case, the operator operates the forced check-in button 37 of the vehicle 4 by using the external terminal 31. In response to this operation, the external terminal 31 transmits first instruction information to the management apparatus 2 to instruct the forced check-in process of the vehicle 4.

Thereafter, the process proceeds to S2170, where the management apparatus 2 having received the first instruction information transmits second instruction information to the in-vehicle apparatus 3 of the vehicle 4 to instruct a forced check-in process of the vehicle 4. Subsequently, the process proceeds to S2180, where the in-vehicle apparatus 3 of the vehicle 4 receives the second instruction information, performs the check-in process, and turns on the vehicle power source switch 25 to allow traveling of the vehicle 4 by the user.

When it is determined that the current state is not the initial check-in, that is, the current state is a restart of driving of the vehicle 4 (NO in S2150), the process proceeds to S2190. In this case, the operator operates a forced driving restart button (not shown) of the vehicle 4 by using the external terminal 31. In response to this operation, the external terminal 31 transmits first restart information to the management apparatus 2 to instruct a forced driving restart process of the vehicle 4. Note that the forced driving restart button is displayed on the external terminal side display portion 34 of the external terminal 31 at the time of a forced driving restart of the vehicle 4 in a manner substantially similar to that of the forced check-in button 37.

Thereafter, the process proceeds to S2200, where the management apparatus 2 having received the first restart information transmits second restart information to the in-vehicle apparatus 3 of the vehicle 4 to instruct a forced driving restart of the vehicle 4. Subsequently, the process proceeds to S2210, where the in-vehicle apparatus 3 of the vehicle 4 receives the second restart information, performs a driving restart control in the check-in process, and turns on the vehicle power source switch 25 to allow traveling of the vehicle 4 (driving restart) by the user.

Figure 21:
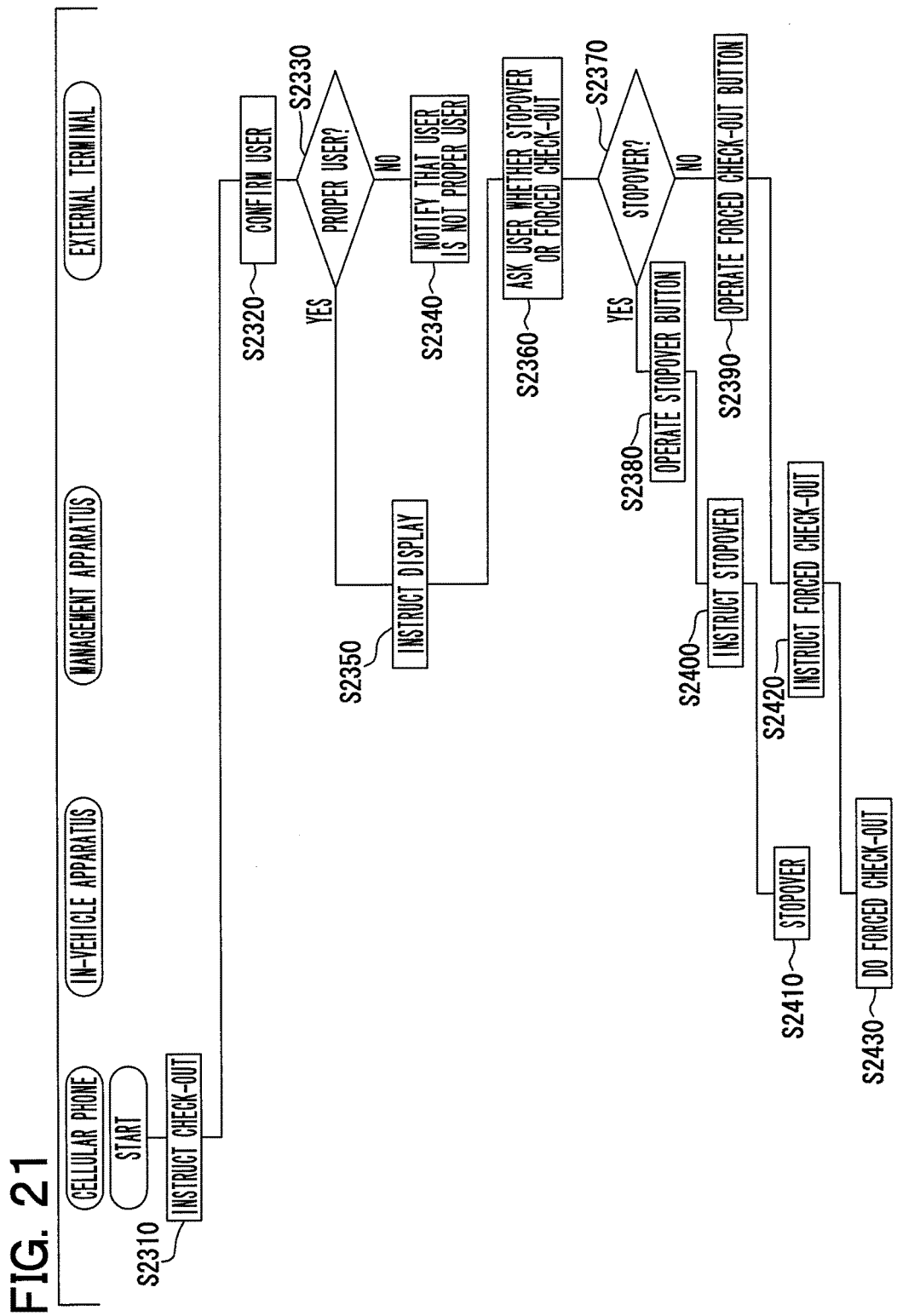
FIG. 21 is a flowchart of a forced check-out process.

A control for a forced check-out process of the vehicle 4 is hereinafter described with reference to a flowchart in FIG. 21. In S2310 in FIG. 21, the user firstly calls the operator to ask (instruct) the operator to perform forced check-out from the vehicle 4.

Subsequently, the process proceeds to S2320, where the operator checks whether the user is a proper user, for example, by using the external terminal 31. When it is determined that the user is not a proper user ("NO" in S2330), the process proceeds to S2340. In this case, the operator tells the user that the user is not a proper user (not registered as member) on the phone, and ends the check-out process without completion.

When it is determined that the user is a proper user ("YES" in S2330), the process proceeds to S2350, where the management apparatus 2 checks detailed reservation information about the user. In addition, the management apparatus 2 transmits the detailed reservation information about the user to the external terminal 31, and also transmits the detailed reservation information about the user, and information for instructing display of a stopover button and a forced check-out button to the external terminal 31. The external terminal 31 having received these pieces of information displays the detailed reservation information about the user, the stopover button, and the forced checkout button on the external terminal side display portion 34.

Subsequently, the process proceeds to S2360, where the operator asks whether the user desires a stopover or forced check-out on the phone. When a stopover has been selected ("YES" in S2370), the process proceeds to S2380. In this case, the operator operates the stopover button by using the external terminal 31. In response to this operation, the external terminal 31 transmits first stopover information to the management apparatus 2 to instruct a stopover process of the vehicle 4. Thereafter, the process proceeds to S2400, where the management apparatus 2 having received the first stopover information transmits second stopover information to the in-vehicle apparatus 3 of the vehicle 4 to instruct stopover of the vehicle 4.

Subsequently, the process proceeds to S2410, where the in-vehicle apparatus 3 of the vehicle 4 receives the second stopover information, performs the stopover process, and turns off the vehicle power source switch 25 to complete a stopover of the vehicle 4 (and give stopover notification to management apparatus 2, for example).

When it is determined that an instruction other than a stopover has been given, that is, forced check-out from the vehicle 4 has been instructed ("NO" in S2370), the process proceeds to S2390. In this case, the operator operates the forced check-out button of the vehicle 4 by using the external terminal 31. In response to this operation, the external terminal 31 transmits first check-out information to the management apparatus 2 to instruct the forced check-out process of the vehicle 4. Thereafter, the process proceeds to S2420, where the management apparatus 2 having received the first check-out information transmits second check-out information to the in-vehicle apparatus 3 of the vehicle 4 to instruct forced check-out from the vehicle 4.

Subsequently, the process proceeds to S2430, where the in-vehicle apparatus 3 of the vehicle 4 receives second check-out information, performs the forced check-out process, and turns off the vehicle power source switch 25 to complete check-out from the vehicle 4 (and gives forced check-out notification to management apparatus 2, for example).

Note that configurations of the second embodiment other than the above configuration are similar to the corresponding configurations of the first embodiment. Accordingly, effects substantially similar to the effects of the first embodiment can be achieved in the second embodiment. Particularly, in the second embodiment, the operator transmits first instruction information to the management apparatus 2 to instruct check-in to the vehicle 4 by using the external terminal 31 in response to an instruction of check-in to the vehicle 4 given from the user to the operator on the phone. In this case, the management apparatus 2 having received the first instruction information transmits second instruction information to the in-vehicle apparatus 3 to instruct check-in to the vehicle 4. The in-vehicle apparatus 3 having received the second instruction information performs the check-in process of the vehicle 4, and turns on the vehicle power source switch 25. According to this configuration, even when the user forgets or loses the IC card 6, the user is allowed to check-in to the vehicle 4 through the operator and use the vehicle 4.

Moreover, according to the second embodiment, when the user instructs the operator to check-out from the vehicle 4 on the phone, the operator transmits first check-out information to the management apparatus 2 to instruct check-out from the vehicle 4 by using the external terminal 31. In this case, the management apparatus 2 having received the first check-out information transmits second instruction information to the in-vehicle apparatus 3 to instruct forced check-out from the vehicle 4. The in-vehicle apparatus 3 having received the second instruction information performs the check-out process of the vehicle 4, and turns off the vehicle power source switch 25. According to this configuration, even when the user forgets or loses the IC card 6, the user is allowed to check-out from the vehicle 4 through the operator and end the use of the vehicle 4.

According to the second embodiment described above, at the time of the check-in process or the check-out process without use of the IC card 6, the user performs the check-in process or the check-out process of the vehicle 4 with intervention of the operator, while calling the operator at the management center on the phone. Alternatively, the user may give a direct instruction to the management apparatus 2 to perform the check-in process or the check-out process of the vehicle 4 by using the external terminal 31 without intervention of the operator, and allow the management apparatus 2 to perform the check-in process or the check-out process of the vehicle 4. The configuration not requiring intervention of the operator may be configured to always use the external terminal 31 (that is, use external terminal 31 instead of IC card 6) for performing the check-in process and the check-out processing of the vehicle 4, without the need of the IC card 6 for performing the check-in process and the check-out processing of the vehicle 4.

In addition, according to the embodiments described above, the IC card 6 containing the user identification ID (that is, storage medium) is used. However, the present disclosure is not limited thereto, and a cellular phone, a smartphone or other portable devices having a function of a non-contact IC card may be employed.

In addition, according to the embodiments described above, the shift lever of a transmission of the vehicle 4 is shifted to the P position at the time of check-in to or check-out from the vehicle 4, for example. However, it is preferable that the shift lever is shifted to an N position when the vehicle 4 is an electric car (car not having P position).

In addition, according to the embodiments described above, the identification ID of the user is collated by the in-vehicle apparatus 3. However, the present disclosure is not limited thereto, and the identification ID of the user may be collated by the management apparatus 2. According to this configuration, it is preferable that the identification ID read by the user checking portion 17 is transmitted to the management apparatus 2, and the identification ID is collated thereat with information for authentication managed by the management apparatus 2. Thereafter, information about a collation result is transmitted from the management apparatus 2 to the in-vehicle apparatus 3.

In addition, according to the embodiments described above, whether or not the vehicle 4 is positioned within the geo-fence is checked at the time of check-out from the vehicle 4 and a stopover of the vehicle 4. However, it is preferable that whether or not the vehicle 4 is positioned within the geo-fence of the station is also checked at the time of check-in to the vehicle 4 (execution of the process for allowing traveling of vehicle 4), forced check-in to the vehicle 4 and the like. According to this configuration, it is preferable that, when the vehicle 4 is not positioned within the geo-fence of the station, check-in to the vehicle 4 is suspended, and notification (voice output) is given to the user to indicate prohibition of check-in and the necessity to contact an attendant, for example.

Note that the position information obtaining portion 15 corresponds to a position detection portion, the user checking portion 17 corresponds to a card reading portion, and the control portion 19 corresponds to a switch control portion.

It is noted that a flowchart or the processing of the flowchart in the present application includes multiple steps (also referred to as sections), each of which is represented, for instance, as S10. Further, each step can be divided into several sub-steps while several steps can be combined into a single step.

While various embodiments, configurations, and aspects of car sharing system and an in-vehicle apparatus for car sharing system have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of apparatus detecting driving incapability state of a driver.

The invention claimed is:
1. A car sharing system comprising:
an IC card that is carried by a user and includes an identification ID of the user;
an in-vehicle apparatus that is mounted on a vehicle, and includes a card reading portion reading the IC card and a switch control portion performing an on-off control of a vehicle power source switch that allows traveling of a vehicle; and
a management apparatus that is disposed in a reservation management center, wirelessly communicates with the in-vehicle apparatus, manages an operation status of the vehicle, and further manages reservation information, wherein:

the in-vehicle apparatus performs a first reading operation of the IC card with the card reading portion in response to a first touch of the card reading portion with the IC card by the user, executes a check-in process of the vehicle based on authentication of the identification ID by collation between the identification ID, which is read, and the reservation information, performs a second reading operation of the IC card with the card reading portion in response to a second touch of the card reading portion with the IC card by the user after execution of the check-in process, and turns on the vehicle power source switch.

2. The car sharing system according to claim 1, wherein:
the in-vehicle apparatus does not turn on the vehicle power source switch to start traveling when the second reading operation of the IC card is not performed within a set time from the first reading operation of the IC card to collate the reservation information.

3. The car sharing system according to claim 1, wherein:
the in-vehicle apparatus includes a position detection portion detecting a position of the vehicle, and
the in-vehicle apparatus turns off the vehicle power source switch based on determination that the vehicle is in a stopover state, when a stop position of the vehicle is not located within a geo-fence of a station.

4. The car sharing system according to claim 1, wherein:
the in-vehicle apparatus includes a position detection portion that detects a position of the vehicle, and
the in-vehicle apparatus performs confirmation of check-out with the user when a stop position of the vehicle is located within a geo-fence of a station.

5. The car sharing system according to claim 4, wherein:
the in-vehicle apparatus reads the IC card of the user by the card reading portion after the confirmation of check-out with the user, and performs a check-out process of the vehicle and turns off the vehicle power source switch when the identification ID, which is read, is authenticated.

6. The car sharing system according to claim 5, wherein:
the in-vehicle apparatus does not perform the check-out process of the vehicle when a reading operation of the IC card of the user is not performed by the card reading portion within a set time after the confirmation of check-out with the user.

7. The car sharing system according to claim 1, further comprising:
a vehicle side ECU that is mounted on the vehicle and communicates with the in-vehicle apparatus,
wherein
the vehicle side ECU does not allow traveling of the vehicle when a control signal turning on the vehicle power source switch is not output from the in-vehicle apparatus in a state where the vehicle power source switch is turned on.

8. The car sharing system according to claim 7, wherein:
the vehicle side ECU gives notification indicating that the traveling of the vehicle is not allowed when the vehicle side ECU does not allow traveling of the vehicle.

9. The car sharing system according to claim 1 further comprising:
an external terminal that communicates with the management apparatus,
wherein:
the external terminal transmits first instruction information to the management apparatus to instruct check-in to the vehicle, and
the management apparatus transmits second instruction information to the in-vehicle apparatus to instruct check-in to the vehicle upon reception of the first instruction information from the external terminal, causing the vehicle power source switch to be turned on with execution of a check-in process of the vehicle.

10. The car sharing system according to claim 1, further comprising:
an external terminal that communicates with the management apparatus,
wherein:
the external terminal transmits first check-out information to the management apparatus to instruct check-out from the vehicle; and
the management apparatus transmits second check-out information to the in-vehicle apparatus to instruct check-out from the vehicle upon reception of the first check-out information from the external terminal, causing the vehicle power source switch to be turned off with execution of a check-out process of the vehicle.

11. The car sharing system according to claim 1, wherein:
the in-vehicle apparatus includes a position detection portion that detects a position of the vehicle; and
the in-vehicle apparatus performs a process allowing traveling of the vehicle when a stop position of the vehicle is positioned within a geo-fence of a station.

12. An in-vehicle apparatus for a car sharing system, the in-vehicle apparatus comprising:
a card reading portion that reads an IC card including an identification ID of a user;
a switch control portion that performs an on-off control of a vehicle power source switch that allows traveling of a vehicle; and
a communication portion that wirelessly communicates with a management apparatus in a reservation management center,
wherein:
the switch control portion is configured to:
perform a first reading operation of the IC card with the card reading portion in response to a first touch of the card reading portion with the IC card by the user;
execute a check-in process of the vehicle based on a collation between the identification ID read during the first reading operation and information for authentication managed by the management apparatus and on authentication of the identification ID,
perform a second reading operation of the IC card with the card reading portion in response to a second touch of the card reading portion with the IC card by the user after the check-in process, and
turn on the vehicle power source switch.

13. The in-vehicle apparatus for a car sharing system according to claim 12, wherein:
the switch control portion does not transmit to the vehicle, the on-control signal to turn on the vehicle power source switch to start traveling when the second reading operation of the IC card is not performed within a set time from the first reading operation of the IC card to collate the reservation information.

14. The in-vehicle apparatus for a car sharing system according to claim 12, further comprising:
a position detection portion that detects a position of the vehicle,
wherein:

the switch control portion transmits to the vehicle, an off-control signal to turn off the vehicle power source switch based on determination that the vehicle is in a stopover state, when a stop position of the vehicle is not located within a geo-fence of a station.

15. The in-vehicle apparatus for a car sharing system according to claim 12, further comprising:
a position detection portion that detects a position of the vehicle,
wherein:
the switch control portion performs confirmation of check-out with the user when a stop position of the vehicle is located within a geo-fence of a station.

16. The in-vehicle apparatus for a car sharing system according to claim 15, wherein:
the switch control portion reads the IC card of the user by the card reading portion after the confirmation of check-out with the user, and performs a check-out process of the vehicle and transmits to the vehicle an off-control signal that turns off the vehicle power source switch when the identification ID, which is read, is authenticated.

17. The in-vehicle apparatus for a car sharing system according to claim 16, wherein:
the switch control portion does not perform the check-out process of the vehicle when a reading operation of the IC card of the user is not performed by the card reading portion within a set time after the confirmation of check-out with the user.

18. The in-vehicle apparatus for a car sharing system according to claim 12, further comprising:
a position detection portion that detects a position of the vehicle,
wherein:
the switch control portion performs a process allowing traveling of the vehicle when the vehicle is positioned within a geo-fence of a station.

19. A car sharing system comprising:
an in-vehicle apparatus that is mounted on a vehicle, and includes a card reading portion reading an IC card and a switch control portion performing an on-off control of a vehicle power source switch that allows traveling of a vehicle;
a management apparatus that is disposed in a reservation management center, wirelessly communicates with the in-vehicle apparatus, manages an operation status of the vehicle, and further manages reservation information; and
an external terminal that communicates with the management apparatus,
wherein:
the external terminal transmits first instruction information to the management apparatus to instruct check-in to the vehicle in response to execution of an operation to perform a check-in by an operator that has been requested by a user through a telephone; and
the management apparatus transmits second instruction information to the in-vehicle apparatus to instruct check-in to the vehicle upon reception of the first instruction information from the external terminal, causing the vehicle power source switch to be turned on with execution of a check-in process of the vehicle.

20. A car sharing system comprising:
an in-vehicle apparatus that is mounted on a vehicle, and includes a card reading portion reading an IC card and a switch control portion performing an on-off control of a vehicle power source switch that allows traveling of a vehicle;
a management apparatus that is disposed in a reservation management center, wirelessly communicates with the in-vehicle apparatus, manages an operation status of the vehicle, and further manages reservation information; and
an external terminal that communicates with the management apparatus,
wherein:
the external terminal transmits first check-out information to the management apparatus to instruct check-out from the vehicle in response to execution of an operation to perform a check-out by an operator that has been requested by a user through a telephone; and
the management apparatus transmits second check-out information to the in-vehicle apparatus to instruct check-out from the vehicle upon reception of the first check-out information from the external terminal, causing the vehicle power source switch to be turned off with execution of a check-out process of the vehicle.

21. An in-vehicle apparatus for a car sharing system, the in-vehicle apparatus comprising:
a switch control portion that performs an on-off control of a vehicle power source switch that allows traveling of a vehicle; and
a communication portion that wirelessly communicates with a management apparatus in a reservation management center,
wherein:
the switch control portion performs a check-in process of the vehicle and turns on the vehicle power source switch upon reception of second instruction information transmitted from the management apparatus to the communication portion to instruct check-in to the vehicle in response to execution of an operation to perform a check-in by an operator that has been requested by a user through a telephone and in response to first instruction information transmitted from the external terminal to the management apparatus to instruct check-in to the vehicle.

22. An in-vehicle apparatus for a car sharing system, the in-vehicle apparatus comprising:
a switch control portion that performs an on-off control of a vehicle power source switch that allows traveling of a vehicle; and
a communication portion that wirelessly communicates with a management apparatus in a reservation management center,
wherein:
the switch control portion performs a check-out process of the vehicle and turns off the vehicle power source switch upon reception of second check-out information transmitted from the management apparatus to the communication portion to instruct check-out from the vehicle in response to execution of an operation to perform a check-out by an operator that has been requested by a user through a telephone and in response to first check-out information transmitted from the external terminal to the management apparatus to instruct check-out from the vehicle.

* * * * *